United States Patent
Park et al.

(10) Patent No.: US 9,772,711 B2
(45) Date of Patent: Sep. 26, 2017

(54) INPUT PROCESSING METHOD AND ELECTRONIC DEVICE THEREOF

(71) Applicant: Samsung Electronics Co., Ltd., Suwon-si, Gyeonggi-do (KR)

(72) Inventors: Jeong-Min Park, Suwon-si (KR);
Kyung-Tae Kim, Hwaseong-si (KR);
Seung-Eun Lee, Seoul (KR);
Eun-Jung Hyun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/557,607

(22) Filed: Dec. 2, 2014

(65) Prior Publication Data

US 2015/0153893 A1 Jun. 4, 2015

(30) Foreign Application Priority Data

Dec. 3, 2013 (KR) .................... 10-2013-0148969

(51) Int. Cl.
*G06F 3/041* (2006.01)
*G06F 3/0488* (2013.01)

(52) U.S. Cl.
CPC .......... *G06F 3/0416* (2013.01); *G06F 3/0488* (2013.01); *G06F 2203/04803* (2013.01)

(58) Field of Classification Search
CPC .................................................. G06F 3/0416
USPC ......................................... 345/698, 170–177
See application file for complete search history.

(56) References Cited

U.S. PATENT DOCUMENTS

| 2008/0119237 A1* | 5/2008 | Kim ...................... G06F 3/0481 |
| | | 455/566 |
| 2008/0291225 A1* | 11/2008 | Arneson ................. G06F 3/011 |
| | | 345/698 |
| 2009/0184935 A1* | 7/2009 | Kim ...................... G06F 3/0416 |
| | | 345/173 |
| 2012/0075212 A1* | 3/2012 | Park .................... G06F 3/04886 |
| | | 345/173 |
| 2012/0182238 A1 | 7/2012 | Lee |
| 2012/0262407 A1* | 10/2012 | Hinckley ................ G06F 3/038 |
| | | 345/173 |
| 2013/0021269 A1* | 1/2013 | Johnson ................ G06F 3/0488 |
| | | 345/173 |
| 2013/0050081 A1* | 2/2013 | Tu et al. ........................ 345/163 |
| 2013/0050263 A1* | 2/2013 | Khoe et al. .................... 345/634 |
| 2013/0074000 A1* | 3/2013 | Liu et al. ....................... 715/781 |
| 2013/0100042 A1* | 4/2013 | Kincaid ......................... 345/173 |
| 2013/0239069 A1* | 9/2013 | Jeong et al. .................. 715/863 |
| 2013/0285948 A1* | 10/2013 | Zhang ........................... 345/173 |
| 2014/0096074 A1* | 4/2014 | Dojo et al. .................... 715/788 |
| 2014/0109019 A1* | 4/2014 | Rana et al. .................... 715/863 |

(Continued)

FOREIGN PATENT DOCUMENTS

KR 10-2012-0082577 A 7/2012

*Primary Examiner* — Tony Davis
(74) *Attorney, Agent, or Firm* — Jefferson IP Law, LLP

(57) ABSTRACT

A method for operating an electronic device is provided. The method includes detecting a first gesture on a touch screen, dividing a display region of the touch screen into two or more regions according to the first gesture, detecting a second gesture originating in one of the two or more divided regions, and displaying the second gesture according to a region attribute of the one region and the second gesture.

22 Claims, 17 Drawing Sheets

(56) References Cited

U.S. PATENT DOCUMENTS

| | | | |
|---|---|---|---|
| 2014/0125612 A1* | 5/2014 | Park | G06F 3/0416 |
| | | | 345/173 |
| 2014/0184526 A1* | 7/2014 | Cho | 345/173 |
| 2014/0208333 A1* | 7/2014 | Beals et al. | 719/318 |
| 2014/0306905 A1* | 10/2014 | Kim | G06F 3/04886 |
| | | | 345/173 |
| 2015/0020019 A1* | 1/2015 | Liu | 715/780 |
| 2015/0052430 A1* | 2/2015 | Dwan | 715/702 |
| 2015/0081653 A1* | 3/2015 | Hsu et al. | 707/706 |
| 2015/0346944 A1* | 12/2015 | Zhou | 345/173 |

\* cited by examiner

INPUT PROCESSING METHOD AND ELECTRONIC DEVICE THEREOF

CROSS-REFERENCE TO RELATED APPLICATION(S)

This application claims the benefit under 35 U.S.C. §119 (a) of a Korean patent application filed on Dec. 3, 2013 in the Korean Intellectual Property Office and assigned Serial number 10-2013-0148969, the entire disclosure of which is hereby incorporated by reference.

TECHNICAL FIELD

The present disclosure relates to a method and an electronic device for displaying a gesture input to a display module or a touch screen by applying various effects.

BACKGROUND

As multimedia technology and circuit integration technology advance, an electronic device using various multimedia functions becomes smaller and a personal necessity. Further, the electronic device can include a mobile communication function and may provide various additional services such as a voice communication function, a camera function, a data communication function, a video play function, an audio play function, a messenger function, a schedule management function, and an alarm function. Naturally, various programs are used to for those functions, and an input method for using the programs installed in the electronic device varies.

In recent, as the touch screen technology of the electronic device grows, a user can input a command to the touch screen using various input means such as a finger or a digital pen. For example, the touch screen of the electronic device can include an input sensor for inputting the command using the input means such as a hand, and/or an input sensor for inputting the command using the input means such as a digital pen.

In response to a preset gesture input to the display module (e.g., the touch screen), the electronic device can determine not to process the input command. However, the electronic device can control not to determine the unprocessed input as the unnecessary input, but to apply various effects to the gesture input of the display module in association with one or more other gesture inputs.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for operating an electronic device. The method includes detecting a first gesture on a touch screen, dividing a display region of the touch screen into two or more regions according to the first gesture, detecting a second gesture originating in one of the two or more divided regions, and displaying the second gesture according to a region attribute of the one region and the second gesture.

In accordance with an aspect of the present disclosure, an electronic device is provided. The device includes a memory configured to store an instruction to process one or more gestures input to a touch screen, a processor configured to detect a first gesture on the touch screen, to divide a display region of the touch screen to two or more regions according to the first gesture, to detect a second gesture originating in one of the two or more divided regions, and to display the second gesture according to a region attribute of the one region and the second gesture.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
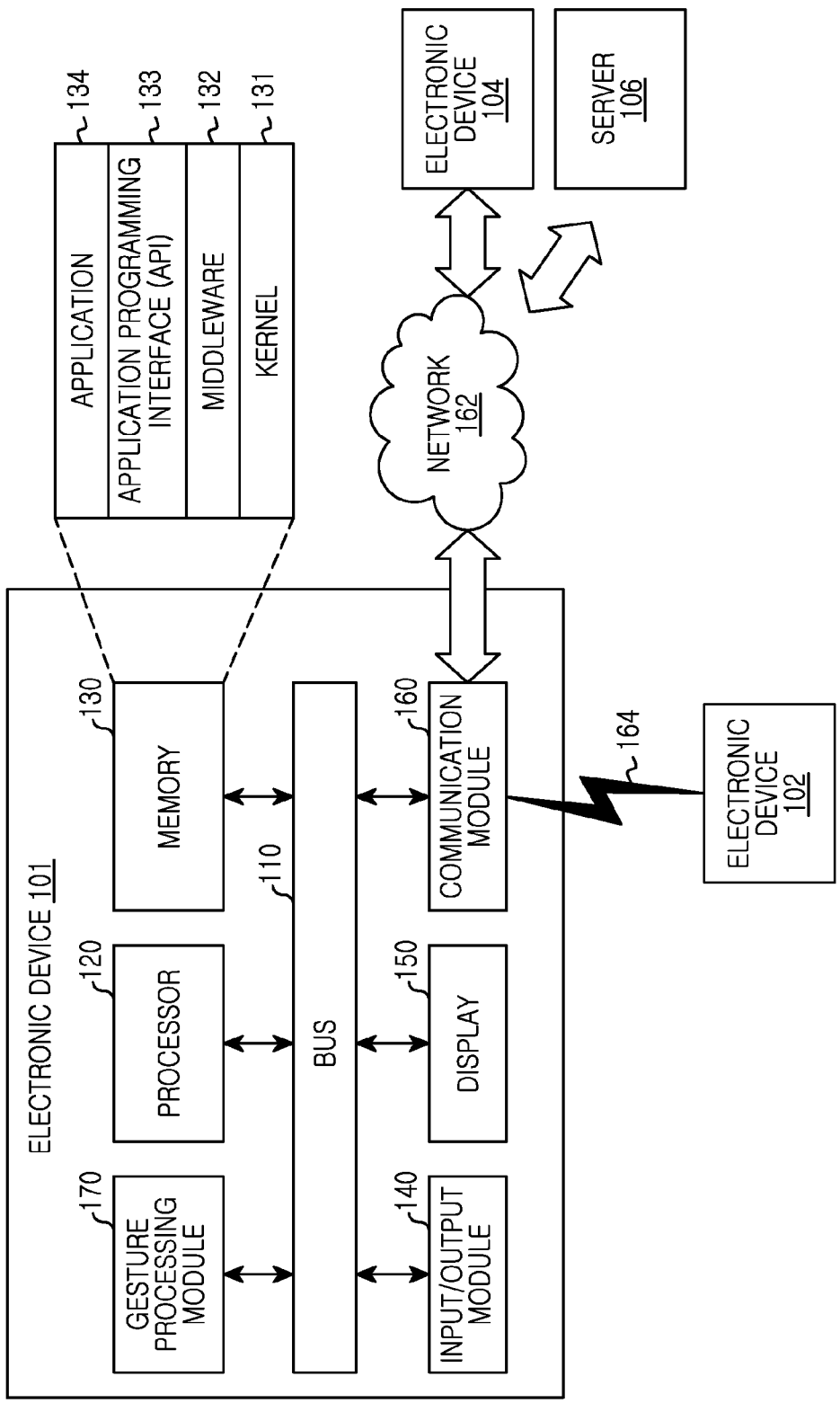
FIG. 1 illustrates a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

According to various embodiments of the present invention, an electronic device 101 can detect a touch input to a display module 150 in a preset manner (e.g., the electronic device 101 can detect a predefined input to the display module 150), and divide the display module 150 into one or more regions based on the detected touch input of the preset manner. The display module 150 of the electronic device 101 is divided into one or more regions in order to define a virtual threshold line in the display module 150 and to assign preset functions to the regions respectively. The expression "the display module 150 is divided into one or more regions" or "the display module 150 divided into one or more regions" implies that the display module 150 divides a screen region (e.g., a screen region) for displaying an operation status of the electronic device 101 into one or more regions.

The terms used herein are merely used to describe specific embodiments, and are not intended to limit the present disclosure. An expression used in the singular encompasses the expression of the plural, unless it has a clearly different meaning in the context. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Although terms including ordinal numbers, such as "first" and "second," and the like, may be used to describe various components, such components are not limited by the above terms. The above terms are used only to distinguish one component from another. For example, a first component may be referred to as a second component without departing from the scope of the present disclosure, and likewise a second component may be referred to as a first component. The term of "and/or" encompasses a combination of plural items or any one of the plural items.

In the case according to which a component is referred to as being "connected" or "accessed" to other component, it should be understood that not only the component is directly connected or accessed to the other component, but also there may exist another component between them. Meanwhile, in the case according to which a component is referred to as being "directly connected" or "directly accessed" to other component, it should be understood that there is no component there between.

Unless defined otherwise, all terms used herein have the same meaning as commonly understood by those of skill in the art. Such terms as those defined in a generally used dictionary are to be interpreted to have the meanings equal to the contextual meanings in the relevant field of art, and are not to be interpreted to have ideal or excessively formal meanings unless clearly defined in the present specification.

The electronic device according to various embodiments of the present disclosure can be a device including the touch screen. For example, the electronic device can include at least one of a smartphone including the touch screen, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical appliance, a camera, and a wearable device (e.g., a Head-Mounted-Device (HMD) such as electronic glasses, an electronic textile, an electronic bracelet, an electronic necklace, an electronic accessory, electronic tattoo, and a smart watch).

The electronic device can be a smart home appliance having the touch screen. The smart home appliance can include, for example, at least one of a television, a Digital Video Disk (DVD) player, an audio system, a refrigerator, an air conditioner, a vacuum cleaner, an oven, a microwave oven, a washing machine, an air purifier, a set-top box, a TV box (e.g., Samsung HomeSync™, AppleTV™, or Google TV™), game consoles, an electronic dictionary, a digital key, a camcorder, and a digital frame.

The electronic device can include at least one of various medical appliances (e.g., Magnetic Resonance Angiography (MRA), Magnetic Resonance Imaging (MRI), Computed Tomography (CT), X-ray, ultrasonicator)), a navigation device, a Global Positioning System (GPS) receiver, an Event Data Recorder (EDR), a Flight Data Recorder (FDR), an in-vehicle infotainment device, marine electronic equipment (e.g., marine navigation device and gyro compass), avionics, a security device, and an industrial or home robot. The electronic device can include at least one of part of furniture or building/structure including the touch screen, an electronic board, an electronic signature receiving device, a projector, and various gauges (e.g., gauges for water, electricity, gas, and radio wave). The electronic device can be one or a combination of those various devices. Those skilled in the art shall understand that the electronic device of the present disclosure is not limited those devices.

Hereinafter, various embodiments of the present disclosure provide an electronic device by referring to the attached drawings. The term "user" can indicate a person or a device (e.g., an artificial intelligence electronic device) who or which uses the electronic device.

FIG. 1 depicts a network environment including an electronic device according to various embodiments of the present disclosure.

Referring to FIG. 1, the electronic device 101 can include a bus 110, a processor 120, a memory 130, an input/output module 140, a display 150, a communication module 160, and a gesture processing module 170.

The bus 110 can be a circuit for interlinking the above-stated components and transferring communication (e.g., control messages) between the components.

The processor 120 can receive an instruction from the components (e.g., the memory 130, the input/output module 140, the display 150, the communication module 160, and the gesture processing module 170) via the bus 110, interpret the received instruction, and perform an operation or a data processing according to the interpreted instruction.

The memory 130 can store the instruction or the data received from or generated by the processor 120 or the other components (e.g., the input/output module 140, the display 150, the communication module 160, and the gesture processing module 170). For example, the memory 130 can include programming modules including a kernel 131, middleware 132, an Application Programming Interface (API) 133, and an application 134. The programming modules can be implemented using software, firmware, and hardware, or a combination of at least two of software, firmware and hardware.

The kernel 131 can control or manage system resources (e.g., the bus 110, the processor 120, or the memory 130) used to execute the operation or the function of other programming modules, for example, the middleware 132, the API 133, and the application 134. The kernel 131 can provide an interface allowing the middleware 132, the API 133, and/or the application 134 to access and control or manage the individual component of the electronic device 101.

The middleware 132 can relay data between the API 133 or the application 134 and the kernel 131. The middleware 132 can control (e.g., schedule or load-balance) work requests received from the applications 134 by giving priority for using the system resource (e.g., the bus 110, the processor 120, or the memory 130) of the electronic device 101 to at least one of the applications 134.

The API 133, which is an interface for the application 134 to control the kernel 131 or the middleware 132, can include at least one interface or function (e.g., instruction) for file control, window control, image processing, or text control.

The application 134 can include a Short Message Service (SMS)/Multimedia Messaging Service (MMS) application, an e-mail application, a calendar application, an alarm application, a health care application (e.g., an application for measuring exercise, a blood sugar level, and/or the like), or an environment information application (e.g., an application for providing air pressure, humidity, temperature information, and/or the like). Additionally or alternatively, the application 134 can involve in information exchange between the electronic device 101 and an external electronic device (e.g., an electronic device 102 or an electronic device 104). The information exchange application can include, for example, a notification relay application for relaying particular information to the external electronic device or a device management application for managing the external electronic device.

For example, the notification relay application can relay the notification information of the other application (e.g., the SMS/MMS application, the e-mail application, the health care application, the environment information application, and/or the like) of the electronic device 101 to the external electronic device (e.g., the electronic device 102 or the electronic device 104). Additionally or alternatively, the notification relay application can receive and provide the notification information from the external electronic device (e.g., the electronic device 102 or the electronic device 104) to the user. The device management application can turn on/off at least part of the function (e.g., the external electronic device (or some components)) of the external electronic device (e.g., the electronic device 102 or the electronic device 104), control brightness (or resolution) of the display, and manage (e.g., install, delete, or update) the service (e.g., the call service or the messaging service) provided by an application of the external electronic device or the external electronic device.

The application 134 can include an application designated based on a region attribute (e.g., a type of the electronic device) of the external electronic device (e.g., the electronic device 102 or the electronic device 104). For example, if the external electronic device is an MP3 player, the application 134 can include a music play application. Similarly, if the external electronic device is a mobile medical device, the application 134 can include a health care application. The application 134 can include at least one of the applications designated in the electronic device 101 and the applications received from the external electronic device (e.g., a server 106, the electronic device 102, and/or the electronic device 104).

The input/output module 140 can forward the instruction or the data input from the user through a sensor (e.g., an acceleration sensor, a gyro sensor) or an input device (e.g., a keyboard or a touch screen) to, for example, the processor 120, the memory 130, the communication module 160 or the gesture processing module 170 via the bus 110. For example, the input/output module 140 can forward the data of the user's touch input through the touch screen, to the processor 120. For example, the input/output module 140 can output the instruction or the data received from the processor 120, the memory 130, the communication module 160, or the gesture processing control module 170 via the bus 110, through the output device (e.g., a speaker or a display). For example, the input/output module 140 can output voice data processed by the processor 120 to the user through the speaker.

The display 150 can display various information (e.g., multimedia data or text data) to the user.

The communication module 160 can connect the communication between the electronic device 101 and the external device (e.g., the electronic device 102, the electronic device 104, or the server 106). For example, the communication module 160 can support a network communication 162 (e.g., Internet, Local Area Network (LAN), Wide Area Network (WAN), telecommunication network, cellular network, satellite network, or Plain Old Telephone Service (POTS), and/or the like), a short-range communication 164 (e.g., Wi-Fi, Bluetooth (BT), Near Field Communication (NFC), and/or the like), or a wired communication (e.g., Universal Serial Bus (USB), High Definition Multimedia Interface (HDMI), Recommended Standard (RS) 232, POTS, and/or the like). A communication protocol (e.g., a short-range communication protocol, a network communication protocol, or a wired communication protocol) between the electronic device 10 and the external device can be supported by at least one of the API 133 and the middleware 132. The electronic device 102 or the electronic device 104 each can be the same as or similar to the electronic device 101 in type. The electronic device 101 may communicate with the electronic device 104, the server 106, and/or the like across the network 162.

The gesture processing module 170 can process at least part of the information obtained from the other components (e.g., the processor 120, the memory 130, the input/output module 140, the display module 150, and the communication module 160), and provide the processed information to the user in various methods.

The gesture processing module 170 can obtain a first gesture input in the touch screen, divide a display region of the touch screen to one or more regions based on the first gesture input, obtain a second gesture input to the divided touch screen, and display the second gesture input on the touch screen by applying an effect (an effect corresponding to the second input, or an region attribute) corresponding to the region of the second gesture input.

The gesture processing module 170 can detect the first gesture on the touch screen, divide the display region of the touch screen to two or more regions according to the first gesture, detect the second gesture which starts in one of the two or more divided regions, and display the second gesture according to the region attribute of the one region and the second gesture.

The gesture processing module 170 can divide two or more regions with one or more virtual threshold lines determined at a preset location of the display region based on the first gesture input.

The gesture processing module 170 can determine the threshold line at one or more preset distances based on a preset location of the first gesture, or at one or more preset angles based on a preset location of the first gesture.

The gesture processing module 170 can determine the gesture as an input for directly or indirectly touching a preset location of the display region of the touch screen.

When two or more direct touch input regions on the touch screen are within a preset distance and one direct touch input region of the touch screen exceeds a preset area, the gesture processing module 170 can determine the first gesture. When two or more direct touch input regions on the touch screen are within a preset distance, the gesture processing module 170 can determine a preset region covering the two or more direct touch regions as a first gesture region.

The gesture processing module 170 can determine the second gesture as a direct touch input or an indirect touch input in the display region divided into the two or more regions while the first gesture is maintained.

The gesture processing module 170 can predefine one or more effects for the two or more regions determining the second gesture, to apply when the second gesture is displayed in the display region.

The gesture processing module 170 can apply, as the region attribute, one or more of a texture, a color, and a weight of an input means to the second gesture displayed in the display region.

The gesture processing module 170 can display a pointer indicating a content at a preset location based on the preset location of the first gesture region and a location of the detected second gesture with the region attribute.

When the region attribute of the displayed second gesture is maintained, the gesture processing module 170 can move the second gesture into a region of the second region attribute among the two or more divided regions.

When a third gesture following the second gesture is detected, the gesture processing module 170 can display the third gesture by applying the region attribute of the second gesture. The gesture processing module 170 shall be further explained by referring to FIGS. 2 through 9.

Figure 2:
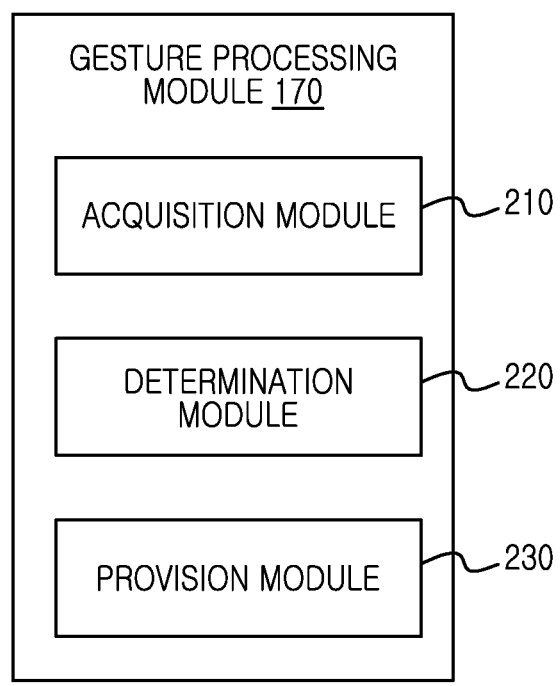
FIG. 2 illustrates a gesture processing module of an electronic device according to various embodiments of the present disclosure.

FIG. 2 illustrates a gesture processing module of an electronic device according to various embodiments of the present disclosure. For example, FIG. 2 is a block diagram of the gesture processing module 170 of the electronic device (e.g., the electronic device 101) according to various embodiments of the present disclosure.

Referring to FIG. 2, the gesture processing module 170 can include an acquisition module 210, a determination module 220, and a provision module 230.

The acquisition module 210 can obtain one or more gesture inputs in the display module 150 of the electronic device 101. The acquisition module 210 can obtain the gesture input in the display module 150 of the electronic device 101 as a direct touch input which inputs the command by contacting the input means to a preset location of the display module 150, and an indirect touch input which inputs the command within a preset distance from the display module 150 without contacting the input means to the preset location of the display module 150.

The determination module 220 can detect the one or more gesture inputs in the display module 150 of the electronic device 101 and determine an inactive touch input region and an active touch region. When two or more direct touch input regions of the display module 150 are within a present distance, the determination module 220 can determine the corresponding direct touch region as the inactive touch input region. For example, when one direct touch input region of the display module 150 exceeds a preset area, the determination module 220 can determine the inactive touch input region. When determining a plurality of inactive touch input regions, the determination module 220 can set the region including the corresponding inactive touch input region to one inactive touch input region.

When determining the active touch input region, the determination module 220 can determine one or more threshold lines at the preset location of the display module 150 based on the inactive touch input region determined with the one or more gesture inputs of the display module 150 of the electronic device 101. The determination module 220 can apply one or more preset effects to the gesture input in the region of the display module 150 divided by the one or more threshold lines determined.

The provision module 230 can detect the gesture input in one or more regions divided in the display module 150, and display the gesture input in the display 150by applying the effect corresponding to the detected gesture input. The provision module 230 may display the detected gesture input in the display module 150 by applying various effects such as texture, color, and pixel (px) of the input means, or display a pointer indicating the preset location of the display module 150 based on the detected gesture.

Figure 3A:
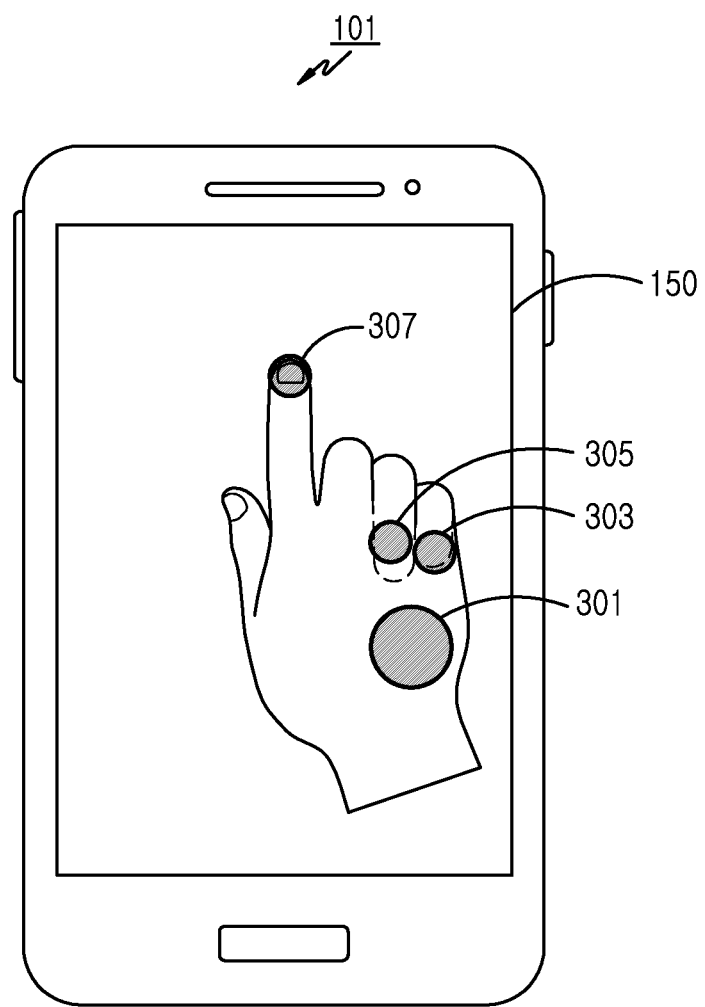
FIGS. 3A and 3B illustrate input processing in an electronic device according to various embodiments of the present disclosure.
Figure 3B:
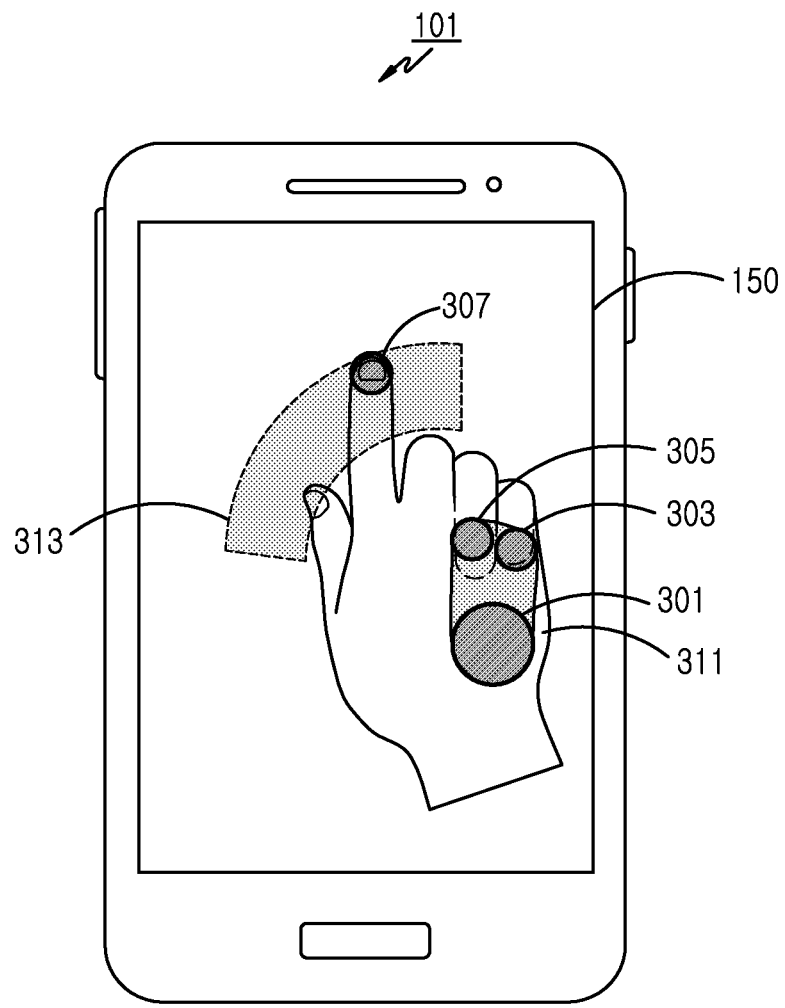

FIGS. 3A and 3B depict the input processing in the electronic device 101 according to various embodiments of the present disclosure. Now Referring to FIG. 3A, the electronic device 101 can divide one or more function regions based on a touch on the display module 150 or a touch on a preset region. For example, when detecting the hand input to the display module 150, the electronic device 101 can detect a first input region (e.g., a preset region of the palm) and a second input region (e.g., a preset region of the finger tip 307) of the hand as shown in FIG. 3A. For example, when the touch input is detected through the display module 150 and the detected touch input lasts beyond the preset region (or beyond the preset area) or one or more touch input regions (e.g., a touch input region 303 or a touch input region 305) is detected in the preset distance from one touch input region (e.g., a touch input region 301), the electronic device 101 can determine the preset region of the palm as the first input region. For example, when the touch input is detected through the display module 150 and the detected touch input falls below the preset area and/or no touch input region is detected within the preset distance, the electronic device 101 can determine the second input region. Although the second input region is the preset region of the finger tip, the second input region can typically select or otherwise correspond to the input means such as touch pen, digital pen, the preset region of the finger tip for indicating a point. The electronic device 101 can determine one or more touch input regions and define an operation corresponding to each region. For example, the electronic device 101 can control to process no command input with respect to the touch input region, such as first input region, exceeding the preset area.

Referring to FIG. 3B, the electronic device 101 can divide one or more touch inputs to the first input region (e.g., the palm input region) and the second input region (e.g., the finger tip input region) based on its setting information. For example, when detecting a plurality of first input regions (e.g., the touch input regions 301, 303, and 305) corresponding to the palm input region, the electronic device 101 can determine the multiple touch input regions as a third input region 311 and control the third input region 311 not to process the input command, like the first input region of FIG. 3A. The electronic device 101 can determine a fourth input region 313 based on the third input region 311. The fourth input region 313 is defined with the input means based on the area and/or shape of the third input region 311 and can range a group of the second touch input regions 307 which are to be input to the display module 150. The electronic device 101 can determine the function by determining one or more input regions according to the type of the touch input region.

When determining the fourth input region 313 based on the third input region 311, the electronic device 101 can use one or more user information stored in its memory (e.g., a database). The database of the electronic device 101 can include a plurality of hand size information determined based on one or more input information which define user's age, gender, nationality, physique such as height, and/or the like. The hand size information in the database of the electronic device 101 can include threshold information of the third input region 311 and/or the fourth input region 313 according to the hand size. When setting a user profile, the electronic device 101 can input one or more information for defining the user's age, gender, nationality, and physique such as height, and determine the hand size matching the user profile in the database. Based on the hand size determined based on the user profile, the electronic device 101 can determine a threshold region of the fourth region based on third input region on the display module 150.

Figure 4A:
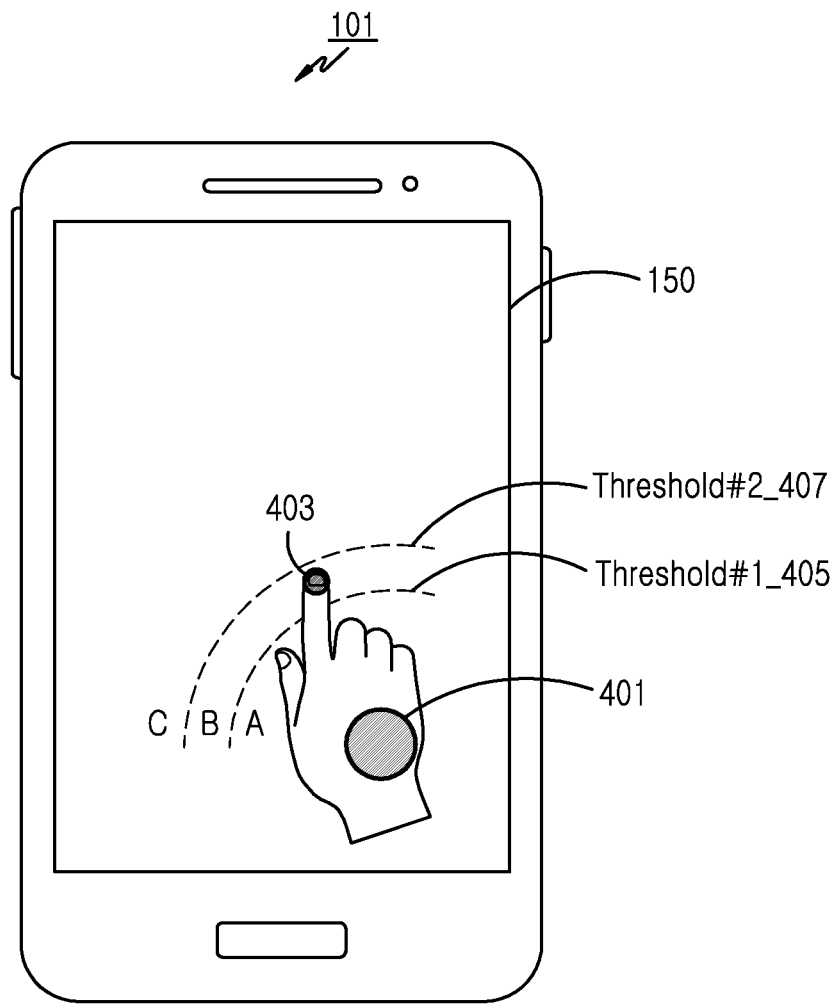
FIGS. 4A and 4B illustrate input processing in an electronic device according to various embodiments of the present disclosure.
Figure 4B:
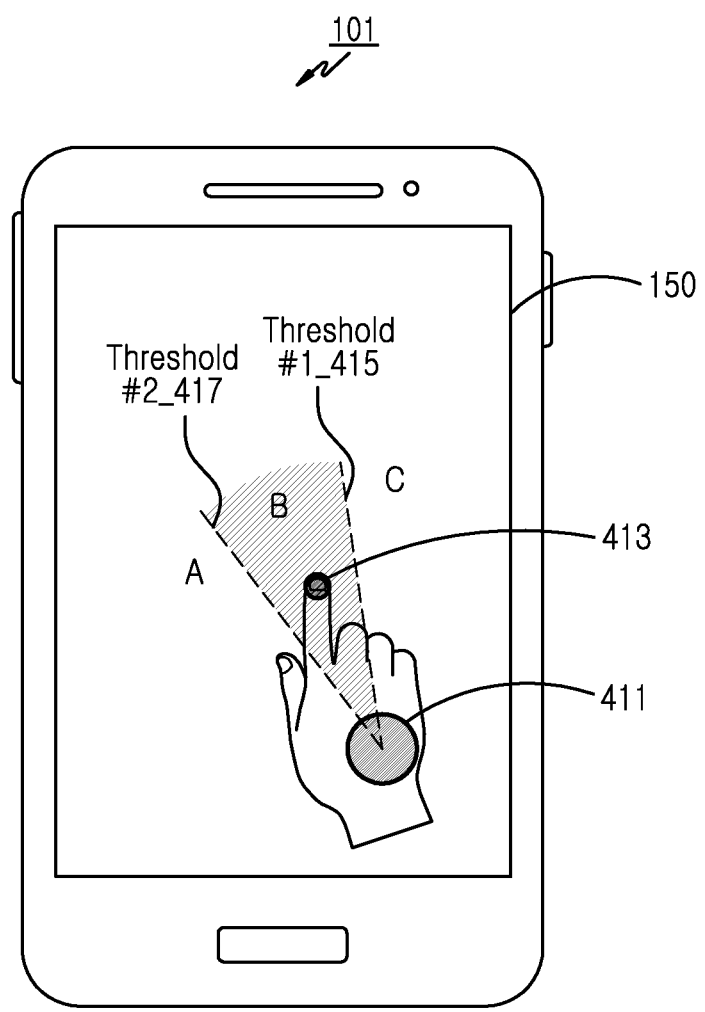

FIGS. 4A and 4B illustrate input processing in an electronic device according to various embodiments of the present disclosure.

According to various embodiments of the present disclosure, the electronic device 101 can divide the preset region of the display module 150 to one or more regions, and determine the function to execute in the divided region.

Referring to FIG. 4A, the electronic device 101 can divide the input region (e.g., the threshold region of the fourth region as mentioned in FIG. 3B) to be input to the display module 150 with the input means into two or regions (e.g., regions A, B and C) according to a preset method of the setting information. The input region may be divided according to a touch input region 401 and a touch input region 403. When dividing the input region, the electronic device 101 can input one or more division methods to the setting information. For example, the electronic device 101 can determine the virtual threshold line (e.g., a threshold #1_405 or a threshold #2_407, the line below the threshold) at one or more preset threshold distances based on the preset location of the inactive touch input region (e.g., the third region of FIG. 4B). The electronic device 101 may or may not display the one or more virtual threshold lines in the display module 150. Based on the virtual threshold line dividing the preset region of the display region 150, the electronic device 101 can set the preset function in each divided region. For example, the electronic device 101 can divide a certain region of the display module 150 into the regions A, B, and C, and detect the touch or the gesture input such as drag in the regions. When detecting the touch in the region A, the electronic device 101 can control to display the texture 'pencil' of the detected touch input. When detecting the touch in the region B, the electronic device 101 can control to display the texture 'charcoal' of the detected touch input (e.g., touch input 4. When detecting the touch in the region C, the electronic device 101 can control to display the texture 'paint' of the detected touch input. As such, the electronic device 101 can display the touch input of the divided regions (e.g., the regions A, B and C) of the display module 150 by applying the corresponding effect based on the setting information. When setting the function in the divided region, the electronic device 101 is not limited to the textures applied to the touch input of the display module 150 and can apply and display the function executable by the electronic device 101 or one or more preset programs of the electronic device 101.

Referring to FIG. 4B, the electronic device 101 can determine the virtual threshold line (e.g., a threshold #1_415 or a threshold #2_417, the line below the threshold) according to one or more preset threshold angles based on the preset location of the inactive touch input region (e.g., the third region of FIG. 4B). For example, the inactive touch input region may correspond to the touch input region 411. The electronic device 101 can set the preset function in each divided region based on the virtual threshold line dividing the preset region of the display region 150. For example, the electronic device 101 can divide a certain region of the display module 150 to the regions A, B, and C, and detect the touch or the gesture input such as drag in the regions. When detecting the touch in the region A, the electronic device 101 can control to display the display effect of the detected touch input with 'transparency 0%'. When detecting the touch in the region B (e.g., the touch at touch input region 413), the electronic device 101 can control to display the display effect of the detected touch input with 'transparency 77%'. When detecting the touch in the region C, the electronic device 101 can control to display the display effect of the detected touch input with 'transparency 33%'. As such, the electronic device 101 can display the touch input of the divided regions (e.g., the regions A, B and C) of the display module 150 by applying the corresponding effect based on the setting information. The effect of each region is not limited to the display texture and/or the transparency of FIGS. 4A and 4B, and the electronic device 101 may apply the effect such as color, weight, and font, to the input touch and/or the drag in the display module 150.

For example, the electronic device 101 can shade the one or more divided regions (e.g., the regions A, B and/or C) so as to identify the one or more regions divided in the display module 150, or display the divided regions on the display module 150 with the virtual threshold line (e.g., the threshold line 415 or 417). When displaying the one or more divided regions (e.g., the regions A, B and/or C) in the display module 150, the electronic device 101 may detect the inactive touch input region, display the one or more divided regions (e.g., the regions A, B and/or C), or display the active touch input (e.g., the direct touch input or the indirect touch input) detected with the input means while the inactive touch input is maintained.

Figure 5A:
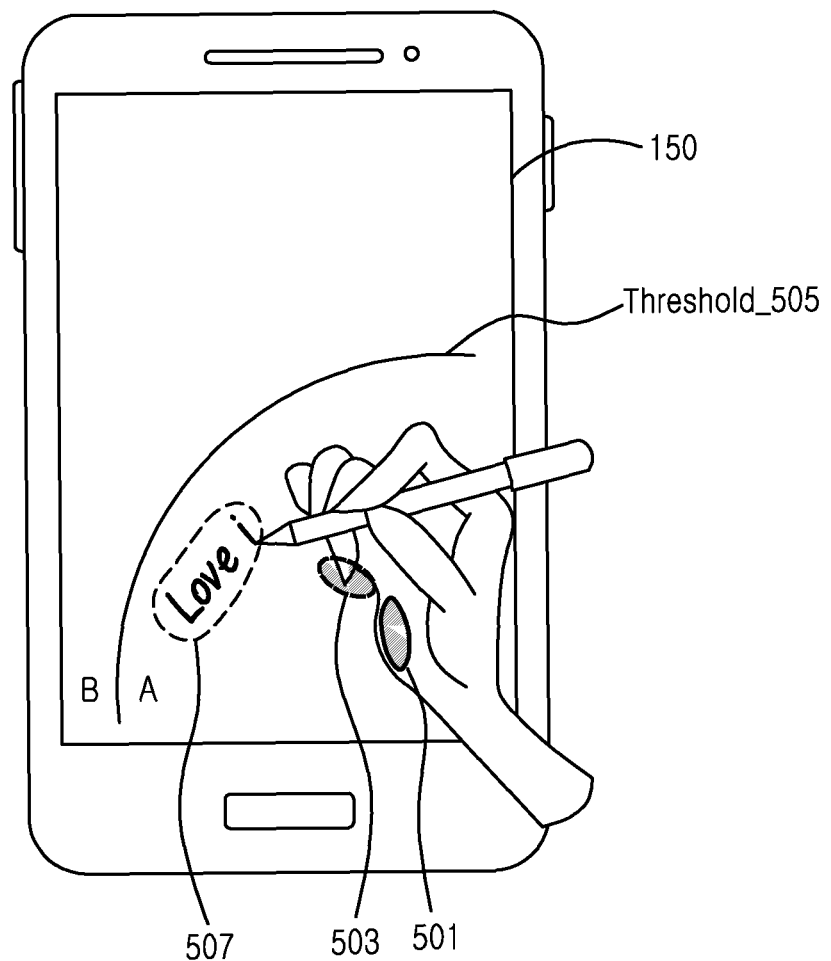
FIGS. 5A and 5B illustrate input processing in an electronic device according to various embodiments of the present disclosure.
Figure 5B:
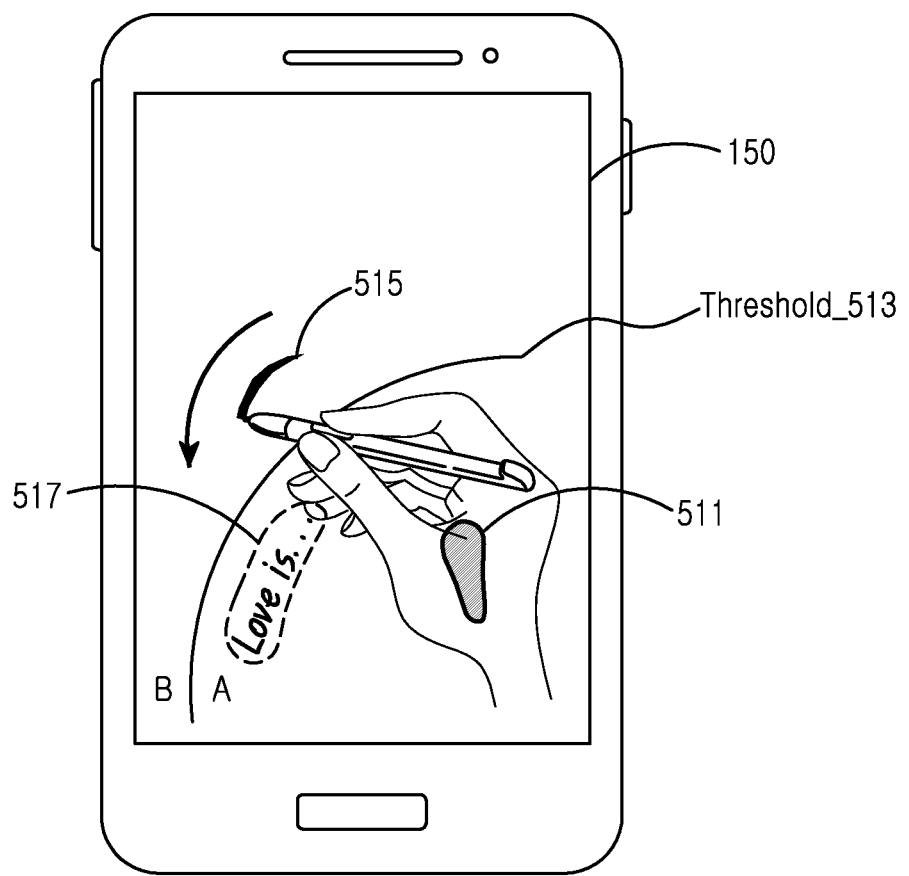

FIGS. 5A and 5B illustrate input processing in an electronic device according to various embodiments of the present disclosure.

According to various embodiments of the present disclosure, the electronic device 101 can set one or more effects to display the touch and/or the hovering input in each of the one or more regions divided based on the virtual threshold line.

Referring to FIG. 5A, the electronic device 101 can set one or more touch input regions (e.g., a region A and a region B) in the display module 150 based on a virtual threshold line 505 determined based on the inactive touch input region (e.g., a touch input region 501 and/or a touch input region 503) of the display module 150. Upon detecting a touch input 507 in the region A of the display module 150, the electronic device 101 can display the detected touch input in the display module 150 by applying the effects 'pencil', 'black', and '3 px (pixel)'. The electronic device 101 can display the touch input detected in the region A based on the virtual threshold line 505 by applying the same effects 'pencil', 'black', and '3 px (pixel)'.

Referring to FIG. 5B, the electronic device 101 can detect the touch input in the region B of the display module 150 during the touch input to the display module 150 or the preset function of the electronic device 101, and display the detected touch input by applying the preset effect.

For example, the electronic device 101 can determine one or more threshold lines 513 based on the inactive touch input 511 on the display module 150, and divide a certain region into one or more regions (e.g., the region A and the region B) based on the determined threshold line 513. When displaying the touch input in the divided regions A and B of the display module 150, the electronic device 101 can apply one or more preset effects to each region.

The electronic device 101 can detect the touch input in the region A of the display module 150 and display the touch input 507 with the effects 517 of 'pencil', 'black', and '3 px (pixel)'. After releasing the touch input 507, the electronic device 101 can detect a touch input 515 of the touch-and-drag at a preset location of the region B. The electronic device 101 can display the touch input 515 detected in the region B of the display module 150 by applying effects 'charcoal', 'black', and '21 px' which are set for the region B.

Figure 6A:
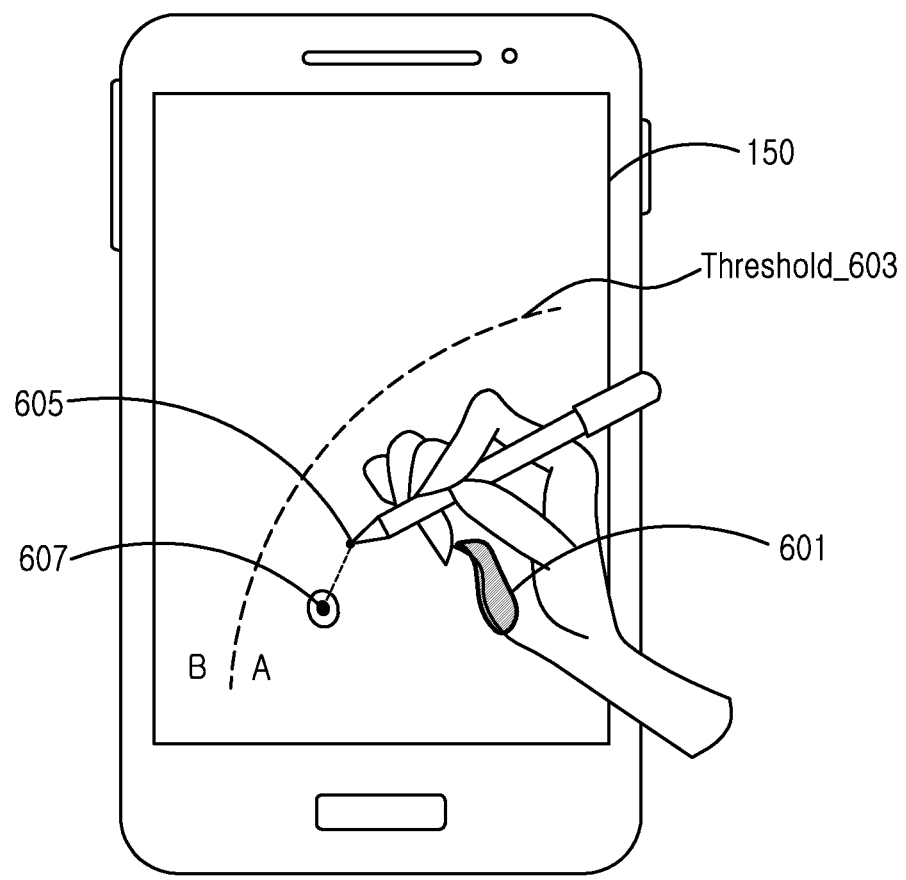
FIGS. 6A and 6B illustrate input processing in an electronic device according to various embodiments of the present disclosure.
Figure 6B:
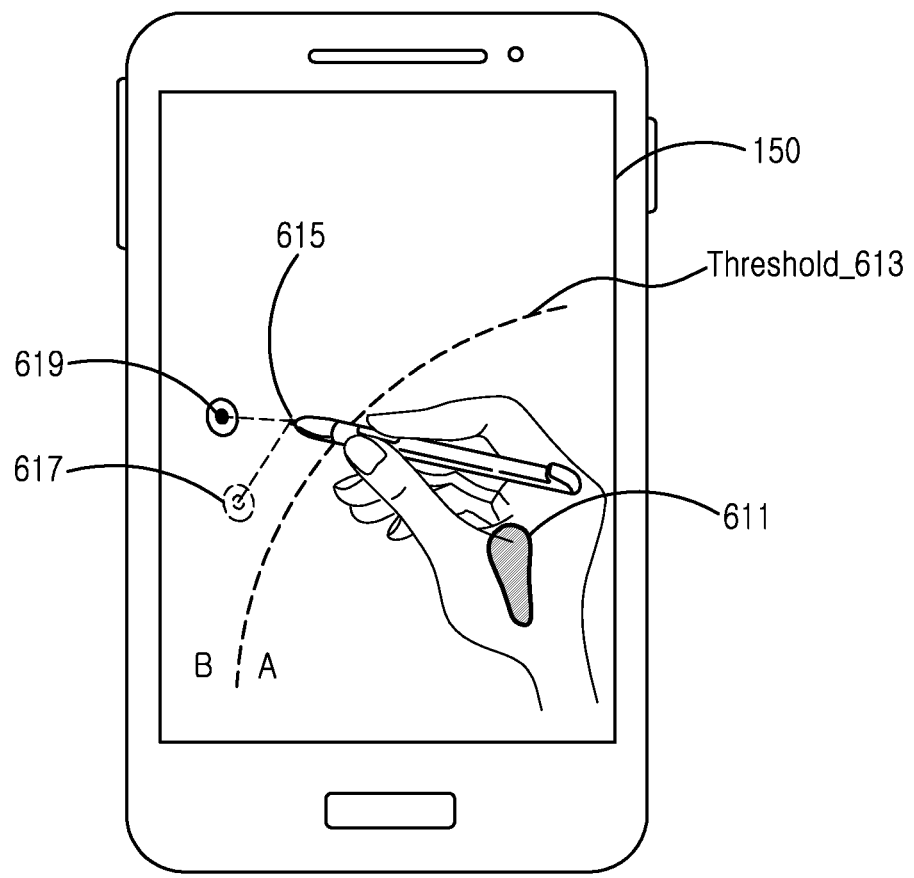

FIGS. 6A and 6B illustrate input processing in an electronic device according to various embodiments of the present disclosure.

According to various embodiments of the present disclosure, the electronic device 101 can divide one or more regions in the display module 150, and display the touch input of the divided region in the display module 150 by applying one or more preset effects. For example, the touch input to the display module 150 can include the direct touch input physically contacting a preset location of the display module 150, and the indirect touch input (e.g., the hovering input) for inputting the command at a preset distance without physically contacting the preset location of the display module 150. To the touch input at the preset location of the display module 150, the electronic device 101 may apply a first effect defined based on the divided region of the display module 150, a second effect defined based on the touch input type of the display module 150, or a third effect which combines the first effect defined based on the divided region of the display module 150 and the second effect defined based on the touch input type of the display module 150.

Referring to FIG. 6A, the electronic device 101 can determine an inactive touch input region 601 in the display module 150. Based on the determined inactive touch input region 601, the electronic device 101 can determine one or more virtual threshold lines (e.g., a threshold line 603). The electronic device 101 can divide the region A and the region B of the display module 150 based on the one or more virtual threshold lines 603 determined in the display module 150. The electronic device 101 can detect a hovering input 605 over the region A of the display module 150. The electronic device 101 can display a hovering pointer 607 at a preset location of the display module 150 which is perpendicular to the detected hovering input, according to a preset method for processing the hovering input in the region A of the display module 150.

Referring to FIG. 6B, the electronic device 101 can detect a hovering input 615 at a preset location of the region B with the input means while displaying the hovering pointer 607 corresponding to the hovering input 615 (e.g., the hovering input 605 of FIG. 6A) in the region A of the display module 150 including one or more divided regions (e.g., the regions A and B). Based on the determined inactive touch input region 611, the electronic device 101 can determine one or more virtual threshold lines (e.g., a threshold line 613). According to a preset method for processing the hovering input 615 in the region B of the display module 150, the electronic device 101 can display a hovering pointer 619 at a preset distance in the opposite direction of the preset location of the inactive touch input region 611 based on the preset location 617 of the display module 150 perpendicular to the detected hovering input.

Figure 7A:
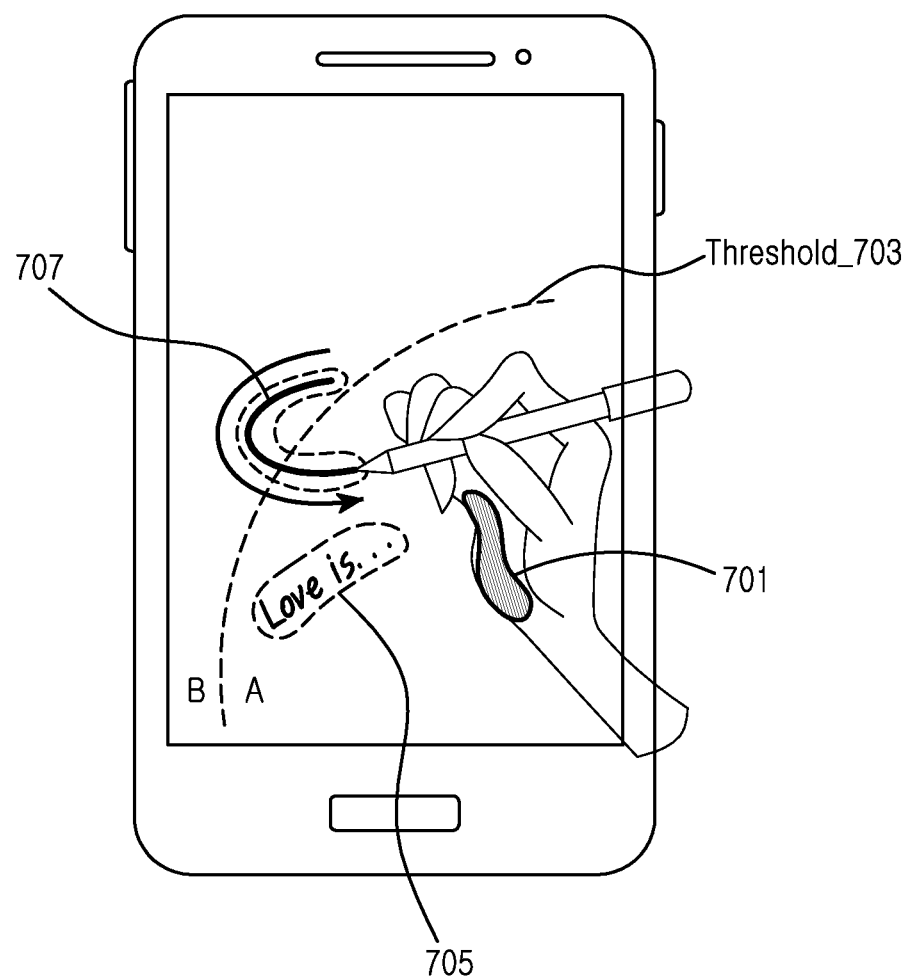
FIGS. 7A, 7B, and 7C illustrate input processing in an electronic device according to various embodiments of the present disclosure.
Figure 7B:
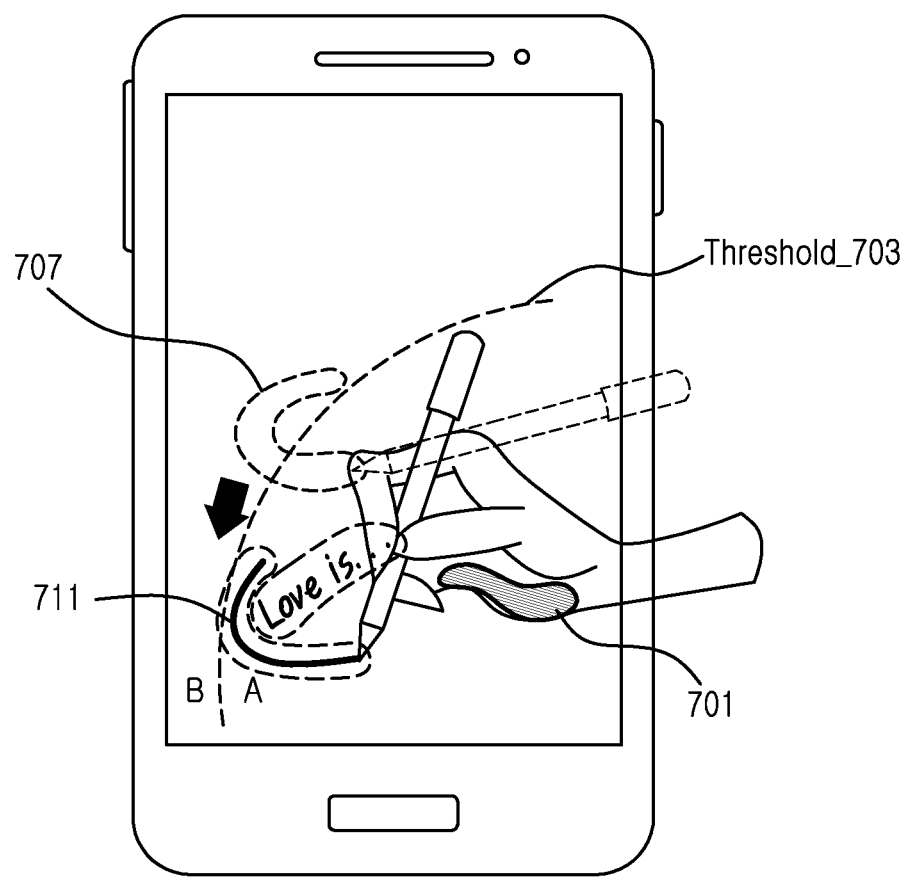
Figure 7C:
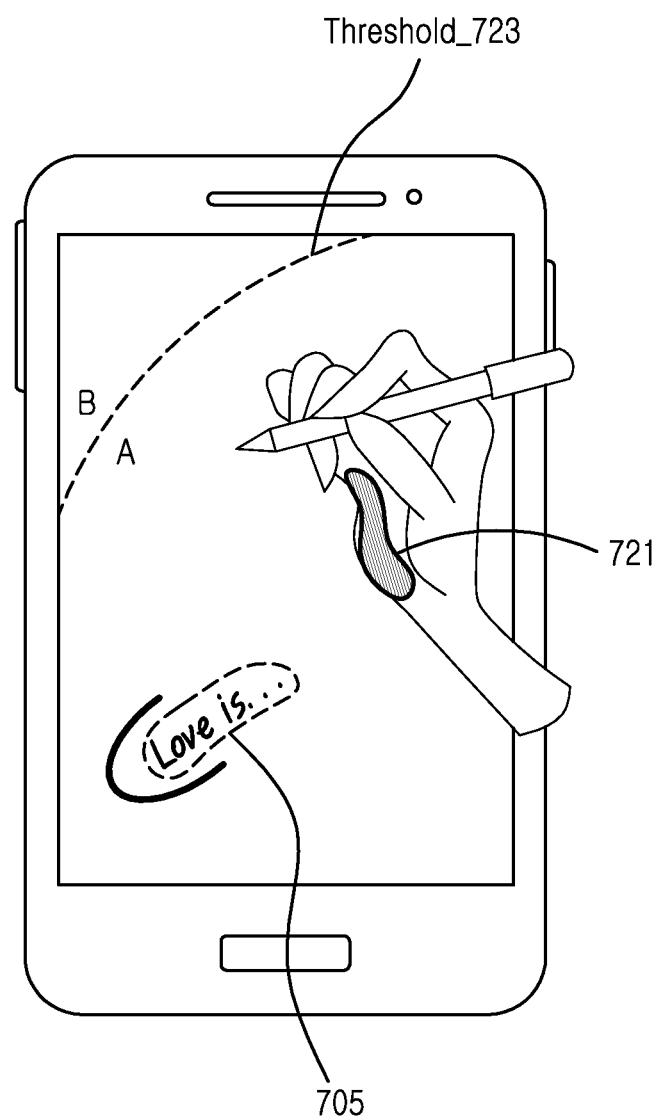

FIGS. 7A, 7B, and 7C, illustrate input processing in an electronic device according to various embodiments of the present disclosure.

Referring to FIG. 7A, the electronic device 101 can detect an inactive touch input region 701 on the display module 150. The electronic device 101 can determine one or more virtual threshold lines (e.g., a threshold line 703) based on the inactive touch input region 701 detected on the display module 150, and divide the display module 150 to one or more regions (e.g., the regions A and B) based on the determined threshold line. The electronic device 101 can set one or more functions for the one or more divided regions of the display module 150. For example, the electronic device 101 can display the touch-and-drag input of the region A in the display module 150 by applying effects 'pencil', 'red', and '7 px'. The electronic device 101 can display the touch-and-drag input of the region B in the display module 150 by applying effects 'pen', 'blue', and '14 px'.

For example, the electronic device 101 can detect the touch-and-drag input (e.g., the direct touch input) in the region A defined based on the inactive touch region 701 detected in the display module 150. According to the setting information of the database, the electronic device 101 can display the input 'Love is . . . ' 705 by applying the effects of the texture 'pencil', the color 'red', and the weight '7 px' of the input means in the region A. When detecting the direct touch input to apply and display the effects defined in the region A to the direct touch input in the region A of the display module 150, the electronic device 101 can detect one or more touch releases in the region A of the display module 150. When detecting the input to the same region (e.g., the region A) or another touch-and-drag input within a preset time, the electronic device 101 can determine and display the single input in the display module 150 by applying the same effects.

For example, the electronic device 101 can detect the touch-and-drag input (e.g., the direct touch input) in the region B defined based on the inactive touch region 701 detected in the display module 150. According to the setting information of the database, the electronic device 101 can display the input sketch (e.g., the touch-and-drag input) 707 by applying the effects 'pen', 'blue', and '14 px' defined in the region B. When detecting the direct touch input in the region B of the display module 150, the electronic device 10 can detect the drag which starts the touch-and-drag input in the B region of the display module 150 and maintains the touch into the region A. The electronic device 101 can determine that the drag in the region A starts from the region B, and continuously display the input sketch (e.g., the touch-and-drag input) 707 by maintaining the effects 'pen', 'blue', and '14 px' defined in the region B. The electronic device 101 can determine that the gesture input which inputs the direct touch to the region B of the display module 150, releases the touch, and then inputs the direct touch to the region A which is the same as or similar to the direct touch of the region B within a preset time, follows the gesture input of the region B, and display the gesture input of the region A by applying the effects of the region B.

Referring to FIG. 7B, the electronic device 101 can move to the second region the gesture displayed by applying the effects corresponding to the first region divided based on the inactive touch input region 701 in the display module 150. For example, the electronic device 101 may move the one or more virtual threshold lines (e.g., threshold line 703) based on the inactive touch input region 701. For example, the electronic device 101 can move to the region A the gesture 707 displayed by applying the effects (e.g., the texture 'pen', the color 'blue', and the weight '14 px') of the region B in the region A and the region B divided based on the inactive touch input region 701. While the gesture input to the region A of the display module 150 of the electronic device 101 is displayed in the display module 150 with the effects of the texture 'pencil', the color 'red', and the weight '7 px' of the input means, a gesture 711 moved from the region B to the region A can be displayed in the region A can be displayed in the region A still with the effects (e.g., the texture 'pen', the color 'blue', and the weight '14 px') of the region B. Further, when the gesture follows the gesture 711 moved to the region A with the effects (e.g., the texture 'pen', the color 'blue', and the weight '14 px') of the region B, the electronic device 101 can display the detected gesture in the display module 150 by applying the effects of the region B.

Referring to FIG. 7C, when one or more regions (e.g., the regions A and B of FIG. 7A) are divided based on the inactive touch input region 701 of FIG. 7A determined at the preset location of the display module 150 and the inactive touch input region 701 is moved to another location (e.g., an inactive touch input region 721) of the display module 150, the electronic device 101 can determine one or more virtual threshold lines (e.g., a threshold line 723) at a preset location based on the moved inactive touch input region 721 and determine two or more divided regions (e.g., regions A and B) based on the threshold line 723.

When determining the two or more divided regions based on the moved (e.g., regenerated or redefined) inactive touch input region, the electronic device 101 can continuously change one or more of the shape, the area, and the detection location with the inactive touch input region detected. The electronic device 101 can change two or more divided regions of the display module 150 according to the inactive touch input region which varies according to the time, and display the two or more changed regions in the display module 150.

Figure 8:
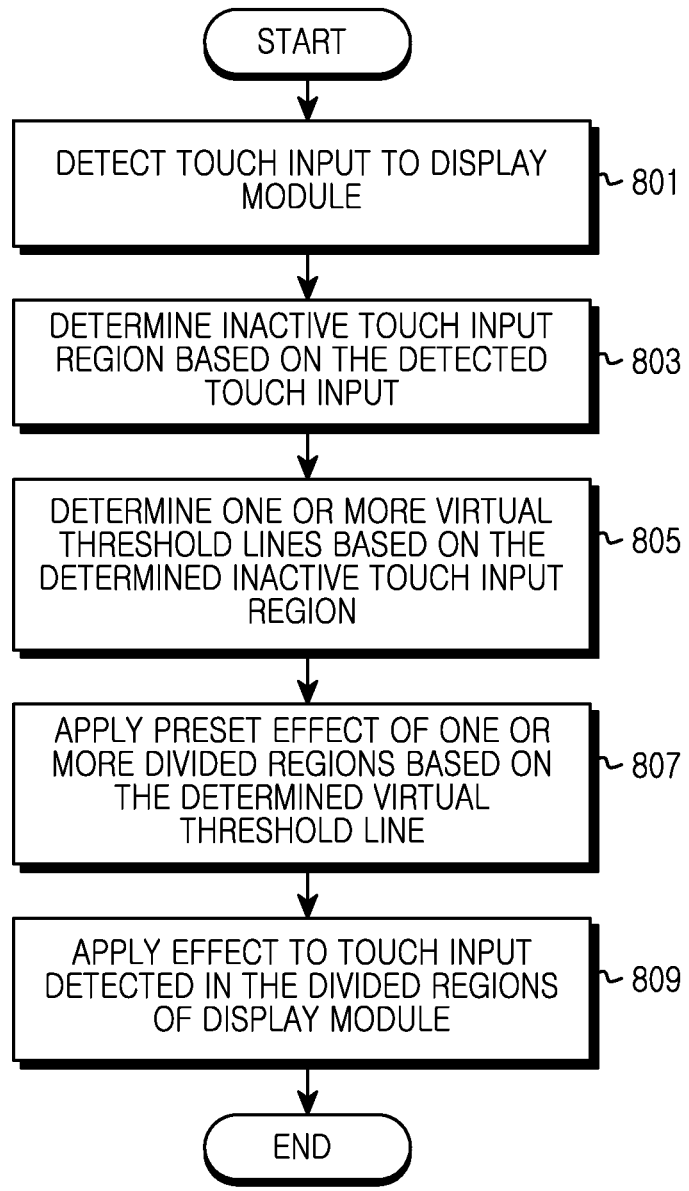
FIG. 8 illustrates a method for processing an input in an electronic device according to various embodiments of the present disclosure.

FIG. 8 illustrates a method for processing an input in an electronic device according to various embodiments of the present disclosure.

According to various embodiments of the present disclosure, electronic device 101 can display the indirect touch input and/or the direct touch input in one or divided regions of the display module 150 in the display module 150 by applying the effects of the setting information of the database.

Referring to FIG. 8, in operation 801, the electronic device 101 can detect the gesture input (e.g., the direct touch input and/or the indirect touch input) in the display module 150. The display module 150 of the electronic device 101 can be implemented using a touch screen for inputting the command by indirectly and/or directly touching with the input means. The electronic device 101 can detect the indirect touch input and/or the direct touch input in the display module 150.

In operation 803, the electronic device 101 can determine one or more inactive touch input regions based on the detected gesture input. For example, the electronic device 101 can detect the direct touch input in the display module 150, and determine one or more direct touch input regions satisfying a preset condition of the database, as the inactive touch input region. For example, when two or more direct touch input regions in the display module 150 are within a preset distance, the electronic device 101 can determine the corresponding direct touch region as the inactive touch input region. For example, when one direct touch input region in the display module 150 exceeds the preset area, the electronic device 101 can determine the inactive touch input region. When determining a plurality of the inactive touch input regions, the electronic device 101 can set the region including the corresponding inactive touch input region, to the single inactive touch input region.

In operation 805, the electronic device 101 can determine one or more virtual threshold lines based on the determined inactive touch input region. For example, the electronic device 101 can determine one or more virtual threshold lines based on the preset location of the inactive touch input region determined during the gesture input in the display module 150. To determine the virtual threshold line, the electronic device 101 may define a preset distance from the preset location of the inactive touch input region, or divide the display module 150 at a preset angle based on the preset location. The electronic device 101 can determine one or more regions of the display module 150 based on the one or more determined threshold lines.

In operation 807, the electronic device 101 can determine the effect for the one or more regions of the display module 150 divided based on the virtual threshold line determined. For example, the electronic device 101 can apply the setting information of the corresponding region of the database, to the preset region of the display module 150 which is divided into one or more regions. For example, for the effect applied to display the gesture input in the display module 150, the electronic device 101 can define one or more of the effects such as type (e.g., texture), color, and weight (e.g., pixel) of the input means and store the setting information per region divided in the display module 150. The electronic device 101 can include one or more setting information in the database, and match the setting information corresponding to the region of the gesture input of the divided regions of the display module 150.

In operation 809, the electronic device 101 can apply the effect of the gesture input region of the one or more divided regions of the display module 150. For example, when detecting the gesture input (e.g., the direct touch input and/or the indirect touch input) in one of the divided regions of the display module 150, the electronic device 101 can apply the effect of the corresponding region to the detected gesture input and display the gesture input in the display module 150 with the effect applied. For example, when displaying the direct touch input of the preset region of the display module 150, the electronic device 101 can apply one or more effects of the divided region of the display module 150 among the effects such as type (e.g., texture), color, and weight (e.g., pixel) of the input means. The electronic device 101 may perform operation 807 and operation 809 as the single step.

Thereafter, the electronic device 101 can finish this process of FIG. 8.

Figure 9:
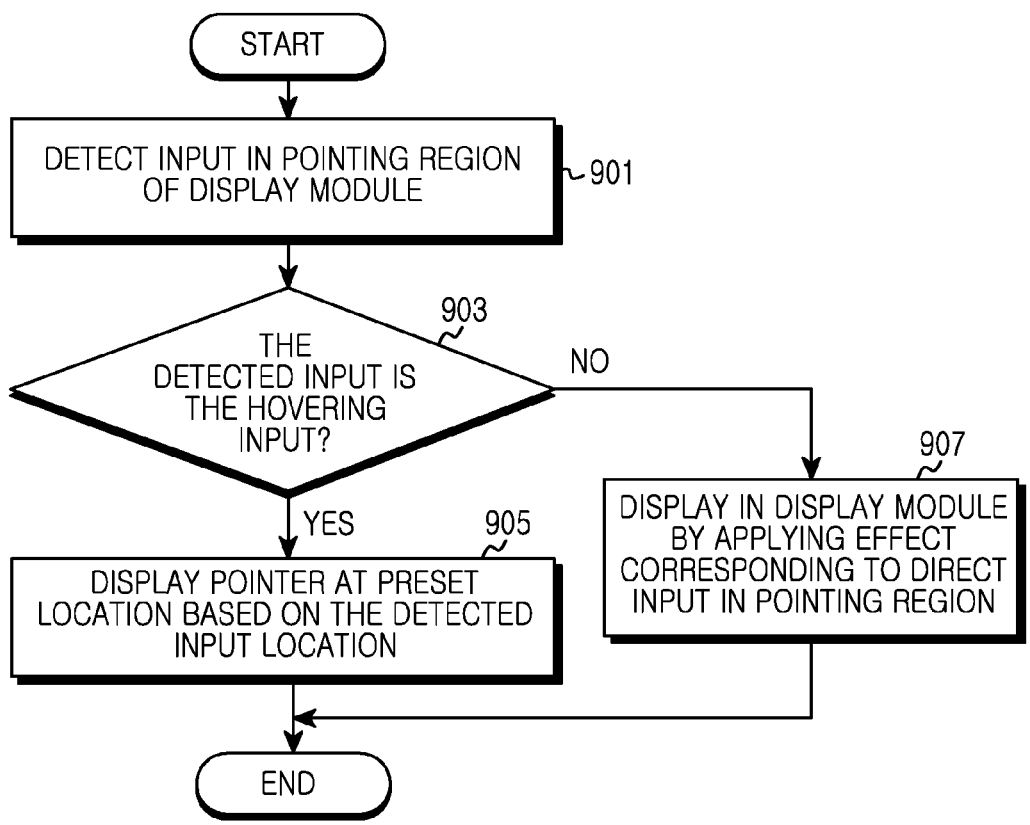
FIG. 9 illustrates a method for processing an input in an electronic device according to various embodiments of the present disclosure.

FIG. 9 illustrates a method for processing an input in an electronic device according to various embodiments of the present disclosure.

According to various embodiments of the present disclosure, when detecting the indirect touch input in the display module 150, the electronic device 101 can display the pointer indicating the preset location of the display module 150 by applying the effect of the corresponding region of the display module 150 divided into one or more regions.

In operation 901, the electronic device 101 can detect the input in the pointing region of the display module 150. For example, when detecting the indirect touch input in the preset region of the display module 150 divided into one or more regions, the electronic device 101 can set the pointing region displaying the pointer indicating the preset location of the display module 150. The electronic device 101 can detect the gesture input in the pointing region of the display module 150.

In operation 903, the electronic device 101 can determine whether the gesture input detected in the pointing region of the display module 150 is the indirect touch input (e.g., whether the detected input is a hovering input). When the gesture input in the pointing region of the display module 150 is the indirect touch input, the electronic device 101 can proceed to operation 905. When the gesture input is the direct touch input, the electronic device 101 can proceed to operation 907.

In operation 905, the electronic device 101 can display the pointer (e.g., the hovering pointer) indicating the preset location of the display module 150 based on the location of the indirect touch input in the pointing region of the display module 150. For example, the electronic device 101 can determine the inactive touch input region at the preset location of the display module 150, and determine the indirect touch input location in the pointing region of the display module 150 based on the inactive touch input region. The electronic device 101 can display the pointer indicating screen configuration displayed at the preset location of the display module 150 based on the indirect touch input location.

Thereafter, the electronic device 101 can finish the process of FIG. 9.

In operation 907, when detecting the direct touch input in the pointing region of the display module 150, the electronic device 101 can apply the preset effect and display the direct touch input in the display module 150 based on the setting information stored in the database. For example, the electronic device 101 can display the direct touch input in the pointing region of the display module 150 by applying one or more effects stored in the setting information among the effects such as type (e.g., texture), color, and weight (e.g., pixel) of the input means.

Thereafter, the electronic device 101 can finish the process of FIG. 9.

A method for operating an electronic device can include obtaining a first gesture input on a touch screen; dividing a display region of the touch screen to two or more regions according to the first gesture input; obtaining a second gesture input in the divided touch screen; and displaying the second gesture input by applying an effect corresponding to the region of the second gesture input (e.g., an effect corresponding to the second input).

A method for operating an electronic device can include detecting a first gesture on a touch screen; dividing a display region of the touch screen to two or more regions according to the first gesture; detecting a second gesture originating in one of the two or more divided regions; and displaying the second gesture according to a region attribute of the one region and the second gesture.

The two or more regions can be divided with one or more virtual threshold lines determined at a preset location of the display region based on the first gesture. The threshold line can be determined at one or more preset distances based on a preset location of the first gesture, or at one or more preset angles based on a preset location of the first gesture.

The gesture can be an input for directly or indirectly touching a preset location of the display region of the touch screen.

When two or more direct touch input regions on the touch screen are within a preset distance, the first gesture can include one direct touch input region of the touch screen exceeding a preset area.

When two or more direct touch input regions on the touch screen are within a preset distance, a preset region covering the two or more direct touch regions can be set to a first gesture region.

The second gesture can be a direct touch input or an indirect touch input in the display region divided to the two or more regions while the first gesture is maintained.

The two or more regions each can predefine one or more effects to apply when the second gesture is displayed in the display region.

The region attribute can apply one or more of a texture, a color, and a weight of an input means to the second gesture displayed in the display region.

The region attribute can display a pointer indicating a content at a preset location based on the preset location of the first gesture region and a location of the detected second gesture.

When the region attribute of the displayed second gesture is maintained, the second gesture can be moved into a region of the second region attribute among the two or more divided regions. When a third gesture following the second gesture is detected, the third gesture can be displayed by applying the region attribute of the second gesture.

Figure 10:
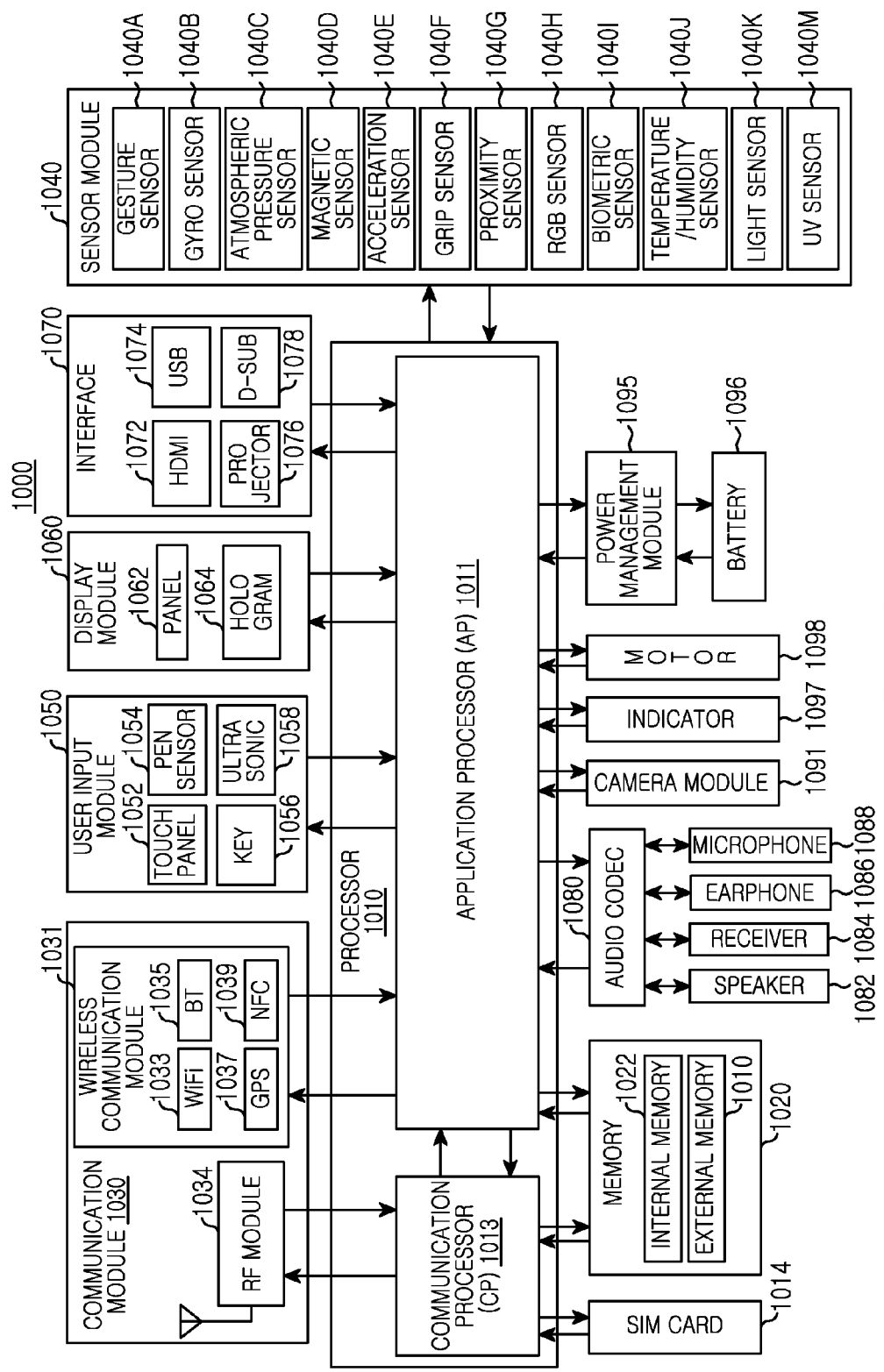
FIG. 10 illustrates an electronic device according to various embodiments of the present disclosure.

FIG. 10 is a block diagram of an electronic device 1000 according to an embodiment of the present disclosure. For example, the electronic device 1000 can configure all or part of the electronic device 101 of FIG. 1.

Referring to FIG. 10, the electronic device 1000 can include one or more processors 1010, a Subscriber Identity Module (SIM) card 1014, a memory 1020, a communication module 1030, a sensor module 1040, an input module 1050, a display 1060, an interface 1070, an audio module 1080, a camera module 1091, a power management module 1095, a battery 1096, an indicator 1097, and a motor 1098.

The processor 1010 (e.g., the processor 120) can include one or more Application Processors (APs) 1011 and one or more Communication Processors (CPs) 1013. Although the AP 1011 and the CP 1013 are included in the processor 1010 of FIG. 10, the AP 1011 and the CP 1013 can be included in different Integrated Circuit (IC) packages. The AP 1011 and the CP 1013 may be included in a single IC package.

The AP 1011 can control hardware or software components connected to the AP 1011 by driving an operating system or an application program, and carry out data processing and operations including multimedia data. For example, the AP 1011 can be implemented using a System on Chip (SoC). The processor 1010 can further include a Graphics Processing Unit (GPU) (not shown).

The CP 1013 can manage data links and convert a communication protocol in the communication between the electronic device 1000 (e.g., the electronic device 101) and other electronic devices (e.g., the electronic device 102, the electronic device 104, and the server 106) connected over the network. The CP 1013 can be implemented using, for example, a SoC. The CP 1013 can perform at least part of a multimedia control function. The CP 1013 can determine and authenticate the electronic device in the communication network using the SIM card 1014. In so doing, the CP 1013 can provide the user with services including voice telephony, video telephony, text message, and packet data.

The CP 1013 can control the data transmission and reception of the communication module 1030. Although the components of the CP 1013, the power management module 1095, and the memory 1020 are separated from the AP 1011 in FIG. 10, the AP 1011 can include part (e.g., the CP 1013) of those components.

The AP 1011 or the CP 1013 can load and process the instruction or the data received from its non-volatile memory or at least one of the other components, in a volatile memory. The AP 1011 or the CP 1013 can store data received from or generated by at least one of the other components, in the non-volatile memory.

The SIM card 1014 can be inserted to a slot formed at a specific location of the electronic device. The SIM card 1014 can include unique identification information (e.g., Integrated Circuit Card Identifier (ICCID)) or subscriber information (e.g., International Mobile Subscriber Identity (IMSI)).

The memory 1020 (e.g., the memory 130) can include an internal memory 1022 and an external memory 1024. For example, the internal memory 1022 can include at least one of the volatile memory (e.g., Dynamic Random Access Memory (DRAM), Static RAM (SRAM), Synchronous DRAM (SDRAM)) and the non-volatile memory (e.g., One-Time Programmable Read Only Memory (OTPROM), PROM, Erasable PROM (EPROM), Electrically EPROM (EEPROM), mask ROM, flash ROM, NAND flash memory, NOR flash memory). The internal memory 1022 may employ a Solid State Drive (SSD). The external memory 1024 can further include a flash drive, for example, a Compact Flash (CF), a Secure Digital (SD), a Micro-SD, a Mini-SD, an extreme digital (xD), and a memory stick. The external memory 1024 can be functionally connected to the electronic device 1000 through various interfaces. The electronic device 1000 can further include a storage device (e.g., a storage medium) such as hard drive.

The communication module 1030 (e.g., the communication module 160) can include a wireless communication module 1031 and a Radio Frequency (RF) module 1034. For example, the wireless communication module 1031 can include a Wi-Fi 1033, a BT 1035, a GPS 1037, and an NFC 1039. For example, the wireless communication module 1031 can provide a wireless communication function using a radio frequency. Additionally or alternatively, the wireless communication module 1031 can include a network interface (e.g., LAN card) or a modem for connecting the electronic device 1000 to the network (e.g., Internet, LAN, WAN, telecommunication network, cellular network, satellite network, or POTS).

The RF module 1034 can control the data transmission and reception, for example, the transmission and reception of the RF signal. For example, the RF module 1034 can include a transceiver, a Pulse Amplitude Modulation (PAM), a frequency filter, or a Low Noise Amplifier (LNA), which is not depicted in the drawing. The RF module 1034 can further include a component, for example, a conductor or a conducting wire, for sending and receiving electromagnetic waves in a free space in the wireless communication.

The sensor module 1040 can measure a physical quantity or detect the operation status of the electronic device 1000, and convert the measured or detected information to an electric signal. The sensor module 1040 can include at least one of, for example, a gesture sensor 1040A, a gyro sensor 1040B, an atmospheric pressure sensor 1040C, a magnetic sensor 1040D, an acceleration sensor 1040E, a grip sensor 1040F, a proximity sensor 1040G, a color sensor (e.g., a Red Green Blue (RGB) sensor) 1040H, a biometric sensor 1040I, a temperature/humidity sensor 1040J, a light sensor 1040K, and an UltraViolet (UV) sensor 1040M. Additionally or alternatively, the sensor module 1040 can include an E-noise sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), or a finger print sensor. The sensor module 1040 can further include a control circuit for controlling the one or more sensors.

The input module 1050 can include a touch panel 1052, a (digital) pen sensor 1054, a key 1056, and an ultrasonic input device 1058. The touch panel 1052 can recognize the touch input using at least one of capacitive, resistive, infrared, and Surface Acoustic Wave (SAW) techniques. The touch panel 1052 may further include a controller. The capacitive touch panel can recognize the direct touch or the proximity. The touch panel 1052 may further include a tactile layer. In this case, the touch panel 1052 can provide a tactile response to the user.

The (digital) pen sensor 1054 can be implemented using the same or similar method as or to the user's touch input, or using a separate recognition sheet. The key 1056 can include, for example, a physical button, an optical key, a keypad, or a touch key. The ultrasonic input device 1058, which obtains data by detecting microwave through a microphone 1088 in the electronic device, allows radio frequency identification through the pen which generates an ultrasonic signal. The electronic device 1000 may receive the user input from an external device (e.g., a network, a computer, or a server) connected using the communication module 1030.

The display module 1060 (e.g., the display 150) can include a panel 1062, a hologram 1064, or a projector 1066. The panel 1062 can employ, for example, a Liquid Crystal Display (LCD) or an Active Matrix Organic Light Emitting Diode (AMOLED). The panel 1062 can be implemented flexibly, transparently, or wearably. The panel 1062 may be constructed as the single module together with the touch panel 1052. The hologram 1064 can present a three-dimensional image in the air using interference of light. The projector 1066 can display an image by projecting the light onto a screen. The screen can be inside or outside the electronic device 1000. The display module 1060 can further include a control circuit for controlling the panel 1062, the hologram 1064, or the projector 1066.

The interface 1070 can include, for example, a High Definition Multimedia Interface (HDMI) 1072, a USB 1074, an optical communication port 1076, and a D-sub 1078. The interface 1070 can be included in, for example, the communication module 160 of FIG. 1. Additionally or alternatively, the interface 1070 can include, for example, a Mobile High-Definition Link (MHL) (not shown), an SD/MMC (not shown) or IrDA (not shown).

The audio module 1080 can convert the voice to an electric signal and vice versa. At least part of the audio module 1080 can be included in the input/output module 140 of FIG. 1. For example, the audio codec 1080 can convert voice information which is input or output through a speaker 1082, a receiver 1084, an earphone 1086, or the microphone 1088.

The camera module 1091 can capture a still picture and a moving picture. For example, the camera module 1091 can include one or more image sensors (e.g., a front lens or a rear lens), an Image Signal Processor (ISP) (not shown), or a flash (not shown) (e.g., an LED or a xenon lamp).

The power management module 1095 can manage power of the electronic device 1000. The power management module 1095 can include, for example, a Power Management IC (PMIC), a charger IC, and a battery gauge or a fuel gauge.

For example, the PMIC can be mounted in an IC or a SoC semiconductor. The charging type can be divided to a wired type and a wireless type. The charger IC can charge the battery and prevent overvoltage or overcurrent from flowing from a charger. For example, the charger IC can include a charger IC for at least one of the wired charging type or the wireless charging type. For example, the wireless charging type includes magnetic resonance, magnetic induction, and microwave, and can further include an additional circuit such as coil loop, resonance circuit, rectifier circuit for the wireless charging.

The battery gauge can measure, for example, the remaining capacity of the battery 1096 and the voltage, the current, or the temperature of the charging. The battery 1096 can store or produce electricity and supply the power to the electronic device 1000 using the stored or produced electricity. For example, the battery 1096 can be a rechargeable battery or a solar battery.

The indicator 1097 can display a specific status, for example, a booting state, a message state, or a charging state of the electronic device 1000 or part (e.g., the AP 1011) of the electronic device 1000.

The motor 1098 can convert the electric signal to a mechanic vibration.

Although not depicted, the electronic device 1000 can include a processor (e.g., the GPU) for supporting mobile TV. For example, the processor for supporting the mobile TV can process media data in conformity with Digital Multimedia Broadcasting (DMB), Digital Video Broadcasting (DVB), or media flow standard.

The aforementioned components of the electronic device can include one or more parts, and the name of the corresponding component can differ according to the type of the electronic device. The electronic device of the present disclosure can include at least one of the components, omit some components, or further include other components. Some of the electronic device components can be united to the single entity to carry out the same functions of the corresponding components.

Figure 11:
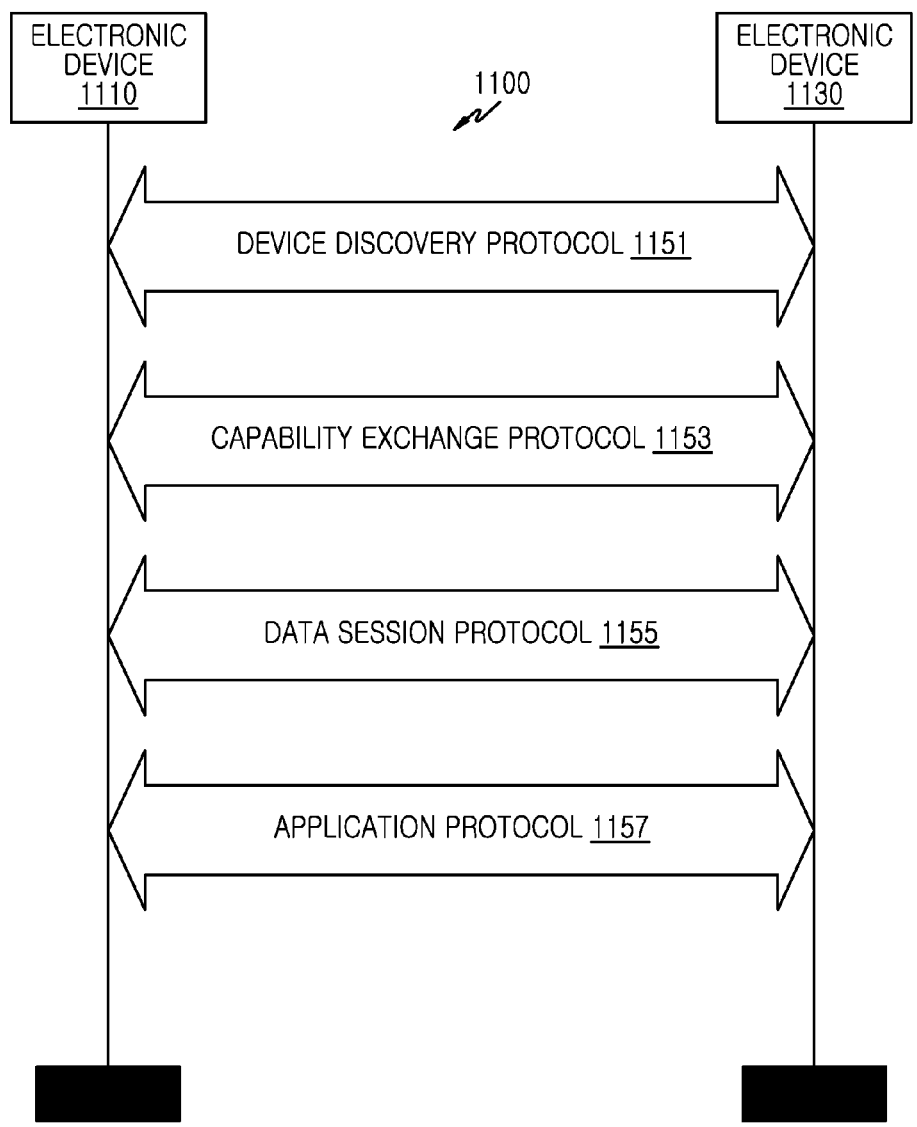
FIG. 11 illustrates a communication protocol between a plurality of electronic devices according to various embodiments of the present disclosure.

FIG. 11 illustrates a communication protocol between a plurality of electronic devices according to various embodiments of the present disclosure.

Referring to FIG. 11, the communication protocol 1100 can include a device discovery protocol 1151, a capability exchange protocol 1153, a data session protocol 1155, and an application protocol 1157.

The device discovery protocol 1151 can be a protocol for the electronic devices (e.g., the electronic device 1110 or the electronic device 1130) to detect an external electronic device for the communication or to connect to the detected external electronic device. For example, the electronic device 1110 (e.g., the electronic device 101) can detect the electronic device 1130 (e.g., the electronic device 102) for communicating with the electronic device 1110 using the available communication method (e.g., the WiFi, the BT, or the USB). To connect the communication with the electronic device 1130, the electronic device 1110 can obtain and store identification information of the detected electronic device 1130 using the device discovery protocol 1151. The electronic device 1110 can establish the communication connection with the electronic device 1130 based on, for example, the at least identification information.

The device discovery protocol 1151 can be a protocol for authenticating a plurality of electronic devices. For example, the electronic device 1110 can perform the authentication between the electronic device 1110 and the electronic device 1130 based on communication information (e.g., Media Access Control (MAC) address, Universally Unique Identifier (UUID), Service Set Identifier (SSID), or Internet Protocol (IP) address) for communicating with the electronic device 1130.

The capability exchange protocol 1153 can be a protocol for exchanging capability information of the available service of at least one of the electronic device 1110 and the electronic device 1130. For example, the electronic device 1110 and the electronic device 1130 can exchange the service capability information of the current service using the capability exchange protocol 1153. The exchanged information can include identification information indicating a particular one of available services of the electronic device 1110 and the electronic device 1130. For example, the electronic device 1110 can receive the identification information of the particular service of the electronic device 1130, from the electronic device 1130 through the capability exchange protocol 1153. Based on the received identification information, the electronic device 1110 can determine whether the electronic device 1110 can support the particular service.

The data session protocol 1155 can be a protocol for controlling dataflow transmitted and received for, for example, the service between the communicatively connected electronic devices (e.g., the electronic device 1110 and the electronic device 1130). For example, at least one of the electronic device 1110 and the electronic device 1130 can control error or data quality using the data session protocol 1155. Additionally or alternatively, the data session protocol 1155 can determine a transport format of data transmitted and received between the electronic device 1110 and the electronic device 1130. At least one of the electronic device 1110 and the electronic device 1130 can manage (e.g., connect or disconnect) the session for the data exchange using the data session protocol 1155.

The application protocol 1157 can be a protocol for providing process or information to exchange the service data of the external electronic device. For example, the electronic device 1110 (e.g., the electronic device 101) can provide the service to the electronic device 1130 (e.g., the electronic device 102, the electronic device 104, or the electronic device 106) through the application protocol 1157.

The communication protocol 1110 can include a standard communication protocol, a communication protocol designated by a person or a group (e.g., a communication protocol designated by a communication device manufacturer or a network provider), or a combination thereof.

The electronic device can determine the gesture input in the display module (e.g., the touch screen) as one or more preset inputs, and display the gesture input by applying one or more effects corresponding to the identified gesture input.

Various embodiments for describing the present disclosure may be performed by using one or more programs included in the memory 130 of the electronic device 101, or may be directly controlled by one or more processor (e.g., the processor 120). In addition, various embodiments of the present disclosure may also be controlled by using one or more control modules (e.g., the gesture processing module 170). According to various embodiments of the present disclosure, the gesture processing module 170 may be controlled by the processor.

The term "module" used herein can indicate, for example, a unit including a combination of one or more of hardware, software, or firmware. The "module" can be interchangeably used with the term, for example, a unit, logic, a logical block, a component, or a circuit. The "module" can be a minimum unit or part of the components integrally formed. The "module" may be a minimum unit or part for one or more functions. The "module" can be implemented mechanically or electronically. For example, the "module" can include at least one of an Application-Specific Integrated Circuit (ASIC) chip, Field-Programmable Gate Arrays (FPGAs), or a programmable-logic device for performing operations which are well known or to be invented.

According to various embodiments of the present disclosure, at least part of the device (e.g., modules or functions) or the method (e.g., operations) described in the claims and/or the specifications of the present disclosure can be implemented using, for example, hardware, software, or a combination thereof. For the software, a non-transitory computer-readable storage medium can store one or more programs (or programming modules). For example, the software can be realized as an instruction stored in the non-transitory computer-readable storage medium in the form of the programming module. One or more program can include instructions for making the electronic device execute the methods described in the claims and/or the specifications. When the instruction is executed by one or more processor (e.g., the processor 210), the one or more processors can perform a function corresponding to the instruction. The non-transitory computer-readable storage medium can be, for example, the memory 220. At least part of the programming module can be implemented (e.g., executed) by the processor 210. At least part of the programming module can include, for example, a module, a program, sets of instructions, or a process for performing one or more functions.

The non-transitory computer-readable recording medium can include magnetic media such as hard disk, floppy disk and magnetic tape, optical media such as Compact Disc Read Only Memory (CD-ROM) and Digital Versatile Disc (DVD), magneto-optical media such as floptical disk, and hardware devices specifically configured to store and execute the application instruction (e.g., the programming module) such as Read Only Memory (ROM), Random Access Memory (RAM), and flash memory, EEPROM, magnetic disc storage devices or other optical storage devices, and magnetic cassettes. Alternatively, the programs may be stored to a memory combining part or all of those recording media. A plurality of memories may be equipped.

The programs may be stored in an attachable storage device accessible via a communication network such as Internet, Intranet, LAN, WLAN, or SAN, or a communication network by combining these networks. The storage device can access the electronic device through an external port. A separate storage device may access the present electronic device over a communication network.

In addition, the application instruction can include not only a machine code made by a compiler but also a high-level language code executable by a computer using an interpreter. The above-stated electronic device can serve as one or more software modules for fulfilling the operations of various embodiments of the present disclosure, and vice versa.

The module or the programming module according to various embodiments of the present disclosure can include at least one of the aforementioned components, omit some components, or further include other components. The operations fulfilled by the modules, the programming modules, or other components can be carried out in sequence, in parallel, repeatedly, or heuristically. In addition, some operations can be executed in a different order or omitted, or other operations can be added.

In the non-transitory computer-readable storage medium storing the instructions, the instructions, when executed by at least one processor, can make the at least one processor perform at least one operation.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating an electronic device, the method comprising:
   detecting at least one first gesture through a touch screen;
   determining whether the at least one first gesture satisfies a predetermined condition;
   determining an inactive touch input region based on the detected at least one first gesture if the at least one first gesture satisfies the predetermined condition;
   dividing at least a portion of a display region of the touch screen into two or more active touch input regions based on the inactive touch input region that is detected based on the at least one first gesture;
   detecting a second gesture for one of the two or more active touch input regions while the at least one first gesture is detected; and
   performing a function corresponding to the second gesture based on a region attribute of the one active touch input region,
   wherein the determining of whether the at least one first gesture satisfies the predetermined condition comprises at least one of:
   determining whether a distance between two or more touch points detected by the at least one first gesture is a predetermined distance, or
   determining whether a size of a touch region detected by the at least one first gesture is a predetermined size.

2. The method of claim 1, wherein the at least a portion of the display region is divided into the two or more active touch input regions based on at least one of an area, a shape, and a location of the inactive touch input region to which the at least one first gesture is detected.

3. The method of claim 1, wherein the at least a portion of the display region is divided into the two or more active touch input regions based on hand size information, and
wherein the hand size information is based on a user profile.

4. The method of claim 1, wherein the at least one first gesture comprises a directly touch input or indirectly touch input for the at least a portion of the display region of the touch screen.

5. The method of claim 1, wherein the second gesture comprises a direct touch input or an indirect touch input for one of the two or more active touch input regions.

6. The method of claim 1, wherein each of the two or more active touch input regions is mapped to one or more effects to perform when the second gesture is detected.

7. The method of claim 1, wherein the performing of the function corresponding the second gesture based on a region attribute of the one active touch input region comprises applying one or more of a texture, a color, and a weight of the region attribute to graphic data corresponding to the second gesture.

8. The method of claim 1, wherein the performing of the function corresponding the second gesture based on a region attribute of the one active touch input region comprises displaying a pointer indicating a content displayed at a location of the detected second gesture.

9. The method of claim 1, wherein, when the region attribute of the function performed by the second gesture is maintained, the second gesture is moved into an active touch input region having other region attribute among the two or more active touch input regions.

10. The method of claim 9, wherein, when a third gesture following the second gesture is detected, a function corresponding to the third gesture is performed by applying the region attribute of the second gesture.

11. The method of claim 1,
wherein the at least one first gesture corresponds to an inactive gesture, and
wherein the dividing of the display region of the touch screen to two or more regions comprises dividing the display region of the touch screen to the two or more active touch input regions based at least in part on an inactivity of the at least one first gesture.

12. An electronic device comprising:
a memory configured to store an instruction to process one or more gestures input to a touch screen; and
a processor configured to control to:
  detect at least one first gesture through the touch screen,
  determine whether the at least one first gesture satisfies a predetermined condition,
  determine an inactive touch input region based on the detected at least one first gesture if the at least one first gesture satisfies the predetermined condition,
  divide at least a portion of a display region of the touch screen into two or more active touch input regions based on the inactive touch input region that is detected based on the at least one first gesture,
  detect a second gesture for one of the two or more active touch input regions while the at least one first gesture is detected, and
  perform a function corresponding to the second gesture based on a region attribute of the one active touch input region,
wherein the processor is further configured to control to determine whether the at least one first gesture satisfies the predetermined condition by determining whether a distance between two or more touch points detected by the at least one first gesture is a predetermined distance, or determining whether a size of a touch region detected by the at least one first gesture is a predetermined size.

13. The electronic device of claim 12, wherein the processor is further configured to divide the at least a portion of the display region based on at least one of an area, a shape, and a location of the inactive touch input region to which the at least one first gesture is detected.

14. The electronic device of claim 12, wherein the processor is further configured to:
determine hand size information based on a user profile, and
divide the at least a portion of the display region based on the hand size information.

15. The electronic device of claim 12, wherein the processor is further configured to determine the at least one first gesture as a directly touch input or indirectly touch input for the at least a portion of the region of the touch screen.

16. The electronic device of claim 12, wherein the processor is further configured to determine the second gesture as a direct touch input or an indirect touch input for one of the two or more active touch input regions.

17. The electronic device of claim 12, wherein the processor is further configured to predefine one or more effects to perform for each of the two or more active touch input regions.

18. The electronic device of claim 12, wherein the processor is further configured to apply, as the region attribute, one or more of a texture, a color, and a weight of the region attribute to graphic data corresponding to the second gesture.

19. The electronic device of claim 12, wherein the processor is further configured to display a pointer indicating a content displayed at a location of the second gesture.

20. The electronic device of claim 12, wherein, when the region attribute of the function performed by the second gesture is maintained, the processor is further configured to move the second gesture into an active touch input region having other region attribute among the two or more regions.

21. The electronic device of claim 12, wherein, when a third gesture following the second gesture is detected, the processor is further configured to perform a function corresponding to the third gesture by applying the region attribute of the second gesture.

22. The electronic device of claim 12,
wherein the at least one first gesture corresponds to an inactive gesture, and
wherein the processor is further configured to divide the at least a portion of the display region of the touch screen to the two or more active touch input regions based at least in part on an inactivity of the at least one first gesture.

* * * * *